US008837985B2

(12) United States Patent
Ishida et al.

(10) Patent No.: US 8,837,985 B2

(45) Date of Patent: Sep. 16, 2014

(54) ELECTROPHOTOGRAPHIC MEMBER AND ELECTROPHOTOGRAPHIC APPARATUS

(71) Applicant: Canon Kabushiki Kaisha, Tokyo (JP)

(72) Inventors: Kazutoshi Ishida, Mishima (JP); Masaki Yamada, Mishima (JP); Minoru Ito, Susono (JP); Kazuhito Wakabayashi, Mishima (JP); Tomoya Uesugi, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/109,886

(22) Filed: Dec. 17, 2013

(65) Prior Publication Data

US 2014/0105646 A1 Apr. 17, 2014

Related U.S. Application Data

(63) Continuation of application No. PCT/JP2013/004561, filed on Jul. 26, 2013.

(30) Foreign Application Priority Data

Jul. 31, 2012 (JP) ................................ 2012-170055

(51) Int. Cl.

*G03G 15/06* (2006.01)
*B32B 27/40* (2006.01)
*C08G 18/70* (2006.01)

(52) U.S. Cl.

USPC ........ 399/119; 399/111; 399/115; 428/423.1; 428/425.5; 428/500; 528/67; 528/69; 528/84; 528/85

(58) Field of Classification Search

USPC ............ 399/115, 119, 111; 428/423.1, 425.5, 428/448, 500; 528/44, 67, 69, 84, 85

See application file for complete search history.

(56) References Cited

U.S. PATENT DOCUMENTS

2012/0195631 A1* 8/2012 Yamada et al. ............... 399/111

FOREIGN PATENT DOCUMENTS

| | | | |
|---|---|---|---|
| JP | 57-5047 | A | 1/1982 |
| JP | 2000-130429 | A | 5/2000 |
| JP | 2008-256780 | A | 10/2008 |
| JP | 2009-237099 | A | 10/2009 |
| JP | 2012-27122 | A | 2/2012 |
| JP | 2012-48126 | A | 3/2012 |

OTHER PUBLICATIONS

PCT International Search Report and Written Opinion of the International Searching Authority, International Application No. PCT/JP2013/004561, Mailing Date Oct. 15, 2013.

* cited by examiner

*Primary Examiner* — Thao T. Tran

(74) *Attorney, Agent, or Firm* — Fitzpatrick, Cella, Harper and Scinto

(57) ABSTRACT

Provided is an electrophotographic member, which hardly changes in performance even when being left to stand for a long time period. The electrophotographic member comprises a support, an elastic layer formed on the support, and a surface layer covering a surface of the elastic layer and containing a urethane resin, and in which the urethane resin comprises a reaction product of: a hydroxyl group-terminated prepolymer obtained by reacting a polyester polyol with a polyisocyanate; and an isocyanate-terminated prepolymer obtained by reacting a polyester polyol with a polyisocyanate.

10 Claims, 4 Drawing Sheets

ELECTROPHOTOGRAPHIC MEMBER AND ELECTROPHOTOGRAPHIC APPARATUS

CROSS-REFERENCE TO RELATED APPLICATIONS

This application is a continuation of International Application No. PCT/JP2013/004561, filed Jul. 26, 2013, which claims the benefit of Japanese Patent Application No. 2012-170055, filed Jul. 31, 2012.

BACKGROUND OF THE INVENTION

1. Field of the Invention

The present invention relates to an electrophotographic member to be used in an electrophotographic apparatus and an electrophotographic apparatus.

2. Description of the Related Art

In an electrophotographic apparatus, electrophotographic members such as a developing member and a charging member are generally constructed as described below. The members each have an elastic layer formed of rubber or the like on the peripheral surface of a support for stabilizing a nip width at its contact portion with a photosensitive member. In addition, it has been known that a surface layer containing a urethane resin is provided on the surface of such elastic layer for the purpose of, for example, stabilizing triboelectric charge-providing performance for toner on the surface or toner-conveying performance, or suppressing the adhesion of the toner to the surface (Japanese Patent Application Laid-Open No. 2000-130429).

By the way, a plasticizer, low-molecular weight component of rubber, or the like for flexibilization is incorporated into the elastic layer. In addition, such component may be deposited on the surface of an electrophotographic member to impair a function of the electrophotographic member. To solve such problem, Japanese Patent Application Laid-Open No. 2009-237099 proposes that a coating layer formed of a coating material containing a carbon atom, and containing both an SP2 structure and SP3 structure based on the carbon atom is provided on the surface of the elastic layer.

SUMMARY OF THE INVENTION

According to an investigation conducted by the inventors of the present invention, owing to its flexibility, the surface layer containing the urethane resin according to Japanese Patent Application Laid-Open No. 2000-130429 has sometimes involved the following problem. When a state where the surface layer abuts on any other member such as a developer layer thickness regulating member or the photosensitive member continues over a long time period, deformation that cannot be easily ameliorated, i.e., compression set occurs in the abutment portion of the surface layer with the other member. In particular, the elastic layer inevitably contains the low-molecular weight component of rubber. Accordingly, such a tendency that the compression set is additionally liable to occur has been observed probably because in the abutment portion of the surface layer with the other member, the low-molecular weight component penetrates into the surface layer to plasticize the resin in the surface layer.

In view of the foregoing, the present invention is directed to providing an electrophotographic member that suppresses the occurrence of compression set in spite of the fact that the member has a surface layer containing a urethane resin.

Further, the present invention is directed to providing an electrophotographic apparatus capable of stably providing high-quality electrophotographic images.

According to one aspect of the present invention, there is provided an electrophotographic member, comprising: a support; an elastic layer formed on the support; and a surface layer covering a surface of the elastic layer and containing a urethane resin, and, in which the urethane resin comprises a reaction product of a hydroxyl group-terminated prepolymer obtained by reacting the following polyester polyol (1) or the following polyester polyol (2) with a polyisocyanate, and an isocyanate-terminated prepolymer obtained by reacting the following polyester polyol (3) or the following polyester polyol (4) with a polyisocyanate:

polyester polyol (1):
- a reaction product of
- at least one carboxylic acid selected from the group consisting of adipic acid and suberic acid,
- an aliphatic triol having 3 or more and 6 or less carbon atoms, and
- an aliphatic diol having 4 or more and 6 or less carbon atoms;

polyester polyol (2):
- a reaction product of
- ϵ-caprolactone and
- an aliphatic triol having 3 or more and 6 or less carbon atoms;

polyester polyol (3):
- a reaction product of
- at least one carboxylic acid selected from the group consisting of adipic acid and suberic acid,
- an aliphatic triol having 3 or more and 6 or less carbon atoms, and
- an aliphatic diol having 4 or more and 6 or less carbon atoms;

polyester polyol (4):
- a reaction product of
- ϵ-caprolactone and
- an aliphatic triol having 3 or more and 6 or less carbon atoms.

According to the present invention, there is provided the electrophotographic member in which compression set hardly occurs in its abutment portion with any other member over a long time period. Further, according to the present invention, provided is the electrophotographic apparatus capable of stably providing high-quality electrophotographic images.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1B:
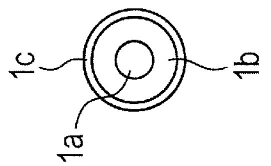
FIG. 1B is a sectional view of the electro-conductive roller as the electrophotographic member according to the present invention.
Figure 1A:
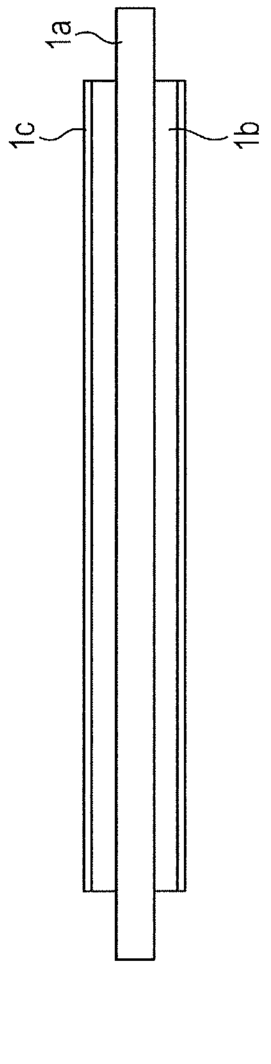
FIG. 1A is a sectional view of an electro-conductive roller as an electrophotographic member according to the present invention.

An electrophotographic member according to the present invention is used as a conductive roller such as a developing roller or charging roller in an electrophotographic apparatus. FIG. 1A and FIG. 1B illustrate schematic sectional views of an example in which the electrophotographic member of the present invention is used as the electro-conductive roller. FIG. 1A and FIG. 1B are schematic sectional views when the electro-conductive roller is cut in parallel and vertical directions with respect to the axial direction of a support 1*a*, respectively. The electro-conductive roller has an elastic layer 1*b* on the outer periphery of the support 1*a*, and has a surface layer 1*c* on the outer periphery of the elastic layer 1*b*.

(Support)

When the electrophotographic member is used as the electro-conductive roller, the support 1*a* functions as a member for supporting an electrode of the electro-conductive roller and the electro-conductive roller, and can be appropriately used irrespective of whether the support is hollow or solid. In addition, for example, the following electro-conductive materials can each be used as a material for the support: a metal or an alloy such as aluminum, a copper alloy, or stainless steel; iron subjected to a plating treatment with chromium or nickel; and a synthetic resin having electro-conductivity.

(Elastic Layer)

The elastic layer 1*b* formed on the support imparts, to the electro-conductive roller, elasticity needed for forming a nip having a predetermined width at an abutment portion with a photosensitive drum or the like. The elastic layer 1*b* can be a single layer or can be multiple layers as long as the object is achieved.

In addition, the elastic layer 1*b* to be used in the present invention can be produced by using a material known in the electro-conductive roller, and, for example, the following rubber materials and electro-conductive agents can each be used as a material for the layer.

Examples of the rubber material include an ethylene-propylene-diene copolymer rubber (EPDM), an acrylonitrile-butadiene rubber (NBR), a chloroprene rubber (CR), a natural rubber (NR), an isoprene rubber (IR), a styrene-butadiene rubber (SBR), a fluororubber, a silicone rubber, an epichlorohydrin rubber, a butadiene rubber (BR), a hydrogenated product of NBR, a polysulfide rubber, and a urethane rubber. The silicone rubber and the epichlorohydrin rubber are particularly preferred from the viewpoint of a reduction in hardness of the elastic layer. However, the rubbers each involve the following problem: a low-molecular weight component or a plasticizer is liable to bleed as an extracted component. It should be noted that one kind of those materials can be used alone, or two or more kinds thereof can be used as a mixture.

Various additives such as an electro-conductivity-imparting agent, a non-electro-conductive filler, a crosslinking agent, and a catalyst are appropriately blended into the elastic layer 1*b*. Available as the electro-conductivity-imparting agent are fine particles of: carbon black; an electro-conductive metal such as aluminum or copper; or an electro-conductive metal oxide such as zinc oxide, tin oxide, or titanium oxide. Of those, carbon black is particularly preferred because carbon black can be obtained with relative ease and provides good electro-conductivity. When carbon black is used as the electro-conductivity-imparting agent, carbon black is preferably blended in an amount of 1 to 80 parts by mass with respect to 100 parts by mass of the rubber component in the elastic layer. Examples of the non-electro-conductive filler include silica, quartz powder, titanium oxide, zinc oxide, and calcium carbonate. Examples of the crosslinking agent include di-t-butyl peroxide, 2,5-dimethyl-2,5-di(t-butylperoxy)hexane, and dicumyl peroxide.

A method known in the electro-conductive roller can be employed as a production method involving providing the elastic layer on the support. Examples thereof include: a method involving coextruding the support and a material for forming the elastic layer to mold the layer; and a method involving injecting the material for forming the elastic layer into a mold in which a cylindrical pipe, dies for holding the support, the dies being provided at both ends of the pipe, and the support are provided, and then heating the material to cure the material.

(Surface Layer)

The surface layer 1*c* covering the surface of the elastic layer contains a urethane resin as a reaction product of a hydroxyl group-terminated prepolymer obtained by reacting the following polyester polyol (1) or the following polyester polyol (2) with a polyisocyanate, and an isocyanate-terminated prepolymer obtained by reacting the following polyester polyol (3) or the following polyester polyol (4) with a polyisocyanate:

polyester polyol (1):
- a reaction product of
- at least one carboxylic acid selected from the group consisting of adipic acid and suberic acid,
- an aliphatic triol having 3 or more and 6 or less carbon atoms, and
- an aliphatic diol having 4 or more and 6 or less carbon atoms;

polyester polyol (2):
- a reaction product of
- ϵ-caprolactone and
- an aliphatic triol having 3 or more and 6 or less carbon atoms;

polyester polyol (3):
- a reaction product of
- at least one carboxylic acid selected from the group consisting of adipic acid and suberic acid,
- an aliphatic triol having 3 or more and 6 or less carbon atoms, and
- an aliphatic diol having 4 or more and 6 or less carbon atoms;

polyester polyol (4):
- a reaction product of
- ϵ-caprolactone and
- an aliphatic triol having 3 or more and 6 or less carbon atoms.

When an electrophotographic apparatus remains unoperated for a long time period, and is operated after having been left to stand under a high-temperature and high-humidity environment, streak-like density unevenness has sometimes occurred in a portion corresponding to a press contact portion with a toner regulating member or a photosensitive drum in an electrophotographic image to be output. As a result of an investigation on a cause for the foregoing, it was able to be confirmed that a hardness near the surface of the press contact portion of the electro-conductive roller reduced.

As a result of a further investigation, it was able to be confirmed that an extracted component of the elastic layer permeated into the surface layer to reduce the hardness of the surface layer and to enlarge compression set. Accordingly, owing to the reduction in hardness of the surface layer due to long-term abutment with any other member and the occurrence of the compression set resulting from the reduction, a toner conveyance amount in a portion where the compression set occurs is different from that in any other portion when the electrophotographic member is used as a developing member. The streak-like density unevenness has sometimes occurred in the electrophotographic image owing to the difference in toner conveyance amount.

In addition, when such electrophotographic member is used as a charging member, charging performance for a photosensitive member in the portion where the compression set occurs is different from that in any other portion, and hence the streak-like density unevenness has sometimes occurred in the electrophotographic image.

Meanwhile, the inventors have found that according to the electrophotographic member including the surface layer containing the urethane resin according to the present invention, when the member is left to stand over a long time period while being brought into abutment with any other member, the plasticization of the surface layer in the abutment portion with the other member is suppressed, and the occurrence of compression set in the surface layer can be effectively suppressed. This is probably because the penetration of a low-molecular weight component from the elastic layer into the surface layer can be effectively suppressed, and even when the low-molecular weight component penetrates from the elastic layer into the surface layer, the movement of the low-molecular weight component in the surface layer is effectively suppressed. Detailed description is given below.

Figure 4:
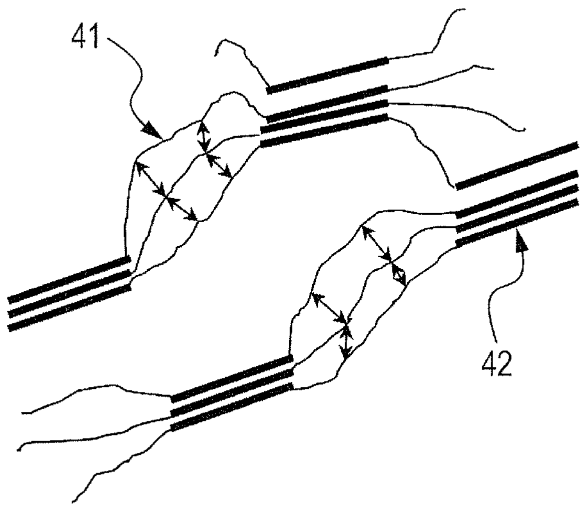
FIG. 4 is an explanatory diagram (1) of the structure of a urethane resin according to the present invention.

FIG. 4 illustrates a schematic view of the structure of the urethane resin according to the present invention.

In general, the urethane resin has a soft segment portion formed of a polyol component having a weak cohesive force, and a hard segment portion 42 formed of a urethane bond having a strong cohesive force. In addition, the inventors of the present invention have conducted studies with a view to densifying the network structure of the soft segment portion in the urethane resin for suppressing the penetration of a low-molecular weight component into the surface layer and suppressing the movement of the low-molecular weight component in the surface layer. As a result, the inventors of the present invention have found that the penetration of the low-molecular weight component from the elastic layer and its movement can be suppressed by a urethane resin satisfying the following conditions (i) and (ii):

(i) the introduction of multiple ester bonds into a soft segment portion between two adjacent urethane bonds; and (ii) the control of the number of carbon atoms between a urethane bond and an ester bond, and the number of carbon atoms between two adjacent ester bonds.

The urethane resin according to the present invention is described with reference to FIG. 5 and FIG. 6 each obtained by further expanding the schematic view of FIG. 4.

It should be noted that FIG. 5 and FIG. 6 below each illustrate an example of a polyester polyurethane in which a soft segment portion sandwiched between urethane bonds is formed of a polyester polyol using an aliphatic diol for describing the technical idea of the present invention in an additionally simple manner.

Figure 5:
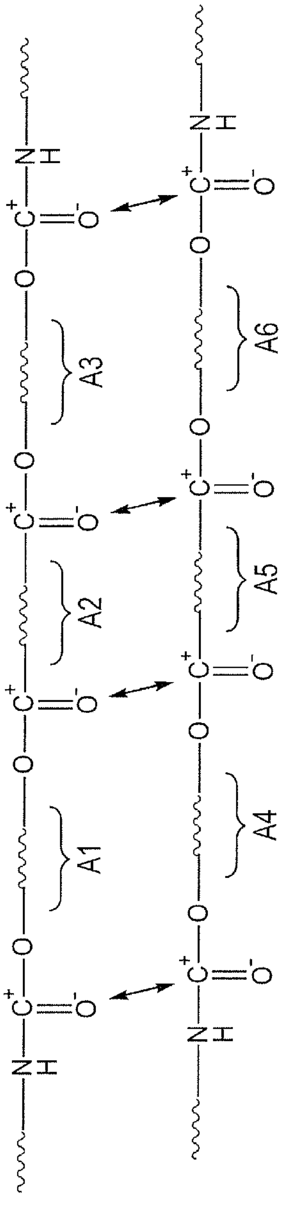
FIG. 5 is an explanatory diagram (2) of the structure of the urethane resin according to the present invention.

FIG. 5 illustrates an example of the urethane resin according to the present invention in which two ester bonds are introduced into a soft segment portion sandwiched between two adjacent urethane bonds. Here, a carbon atom and oxygen atom of a carbonyl group in an ester bond are polarized to δ+ and δ−, respectively.

Accordingly, as schematically illustrated in FIG. 5, electrical attraction may act between the soft segment portions of two molecular chains of the urethane resin to form a pseudo-crosslinked structure. In addition, in the urethane resin according to the present invention, a distance between a urethane bond and an ester bond (each of A1 to A6 in FIG. 5) is determined by the number of carbon atoms present therebetween. In addition, in the urethane resin according to the present invention, the number of carbon atoms present in each of the portions A1, A3, A4, and A6 is 3 to 6 because the aliphatic diol having 4 to 6 carbon atoms or the aliphatic triol having 3 to 6 carbon atoms is used as a raw material. In addition, the number of carbon atoms present in each of the portions A2 and A5 is 4 to 6 because adipic acid, suberic acid, or s-caprolactone is used. That is, the number of carbon atoms between a urethane bond and an ester bond, and the number of carbon atoms between two adjacent ester bonds are each regulated to substantially at most 6. Accordingly, the network structure based on the pseudo-crosslinking in the soft segment portion of the urethane resin according to the present invention may be considerably dense.

Figure 6:
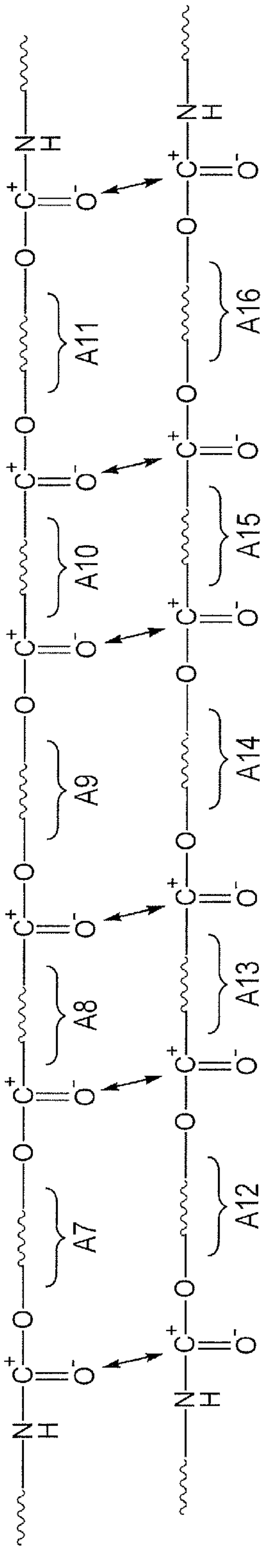
FIG. 6 is an explanatory diagram (3) of the structure of the urethane resin according to the present invention.

FIG. 6 illustrates an example of the urethane resin according to the present invention in which four ester bonds are introduced into a soft segment portion sandwiched between two adjacent urethane bonds.

In this case as well, as schematically illustrated in FIG. 6, electrical attraction may act between the soft segment portions of two molecular chains of the urethane resin to form a pseudo-crosslinked structure. In addition, in the urethane resin according to the present invention, a distance between a urethane bond and an ester bond (each of A7 to A16 in FIG. 6) is determined by the number of carbon atoms present therebetween. In addition, in the urethane resin according to the present invention, the number of carbon atoms present in each of the portions A7, A9, A11, A12, A14, and A16 is 3 to 6 because the aliphatic diol having 4 to 6 carbon atoms or the aliphatic triol having 3 to 6 carbon atoms is used as a raw material. In addition, the number of carbon atoms present in each of the portions A8, A10, A13, and A15 is 4 to 6 because adipic acid, suberic acid, or ϵ-caprolactone is used. That is, the number of carbon atoms between a urethane bond and an ester bond, and the number of carbon atoms between two adjacent ester bonds are each regulated to substantially at most 6. Accordingly, the network structure based on the pseudo-crosslinking in the soft segment portion of the urethane resin according to the present invention may be considerably dense.

It should be noted that FIG. 5 and FIG. 6 are each an example illustrating the structure of the soft segment portion, and the number of ester bonds to be introduced into the soft segment portion in the present invention is not limited to those illustrated in FIG. 5 and FIG. 6.

Meanwhile, the inventors of the present invention have confirmed that the elastic layer containing the silicone rubber may contains a hexamer of a cyclic siloxane as a low-molecular weight component that is liable to bleed to its surface. In addition, the inventors of the present invention have assumed that it is difficult for the cyclic siloxane to pass through the network structure formed of the molecular chain of the urethane resin according to the present invention. Accordingly, when the surface layer containing the urethane resin according to the present invention is provided on the elastic layer containing the silicone rubber, the migration of the cyclic siloxane from the elastic layer to the surface layer is inhibited. In addition, even when the cyclic siloxane migrates from the elastic layer to the surface layer, its movement in the surface layer is inhibited by the network structure of the molecular chain. As a result of the foregoing, compression set hardly occurs in the electrophotographic member according to the present invention.

Upon synthesis of the urethane resin according to the present invention, both the polyol and the polyisocyanate are preferably turned into a prepolymer. Thus, a phenomenon in which an urethanation reaction nonuniformly progresses to make the distribution of a crosslink density nonuniform can be suppressed. That is, the size of the network structure formed of the molecular chain of the urethane resin can be uniformized, which is conducive to the formation of a surface layer capable of suppressing, with additional reliability, the penetration of a low-molecular weight component from the elastic layer and the movement of the low-molecular weight component in the surface layer. It should be noted that a known method can be employed as a method of turning the polyol and the polyisocyanate into a prepolymer.

Adipic acid or suberic acid is used as a dicarboxylic acid to be used for obtaining the polyester polyol (1) or (3). The use of adipic acid or suberic acid can prevent the penetration of an extracted component from the elastic layer into the surface layer because the use optimizes the size of a network formed by an intermolecular force between carbonyl groups in a urethane bond and an ester bond.

A diol having 4 or more and 6 or less carbon atoms is used as a diol to be used for obtaining the polyester polyol (1) or (3). Setting the number of carbon atoms of the diol within the range can prevent the penetration of the extracted component from the elastic layer into the surface layer because the setting optimizes the size of a network formed by an intermolecular force between carbonyl groups in a urethane bond and an ester bond. It should be noted that a known diol can be used as long as the diol has 4 or more and 6 or less carbon atoms. Examples thereof include 1,2-butanediol, 1,3-butanediol, 1,4-butanediol, 2,3-butanediol, 1,2-pentanediol, 1,5-pentanediol, 2,4-pentanediol, 1,2-hexanediol, 1,6-hexanediol, 2,5-hexanediol, and 3-methyl-2,4-pentanediol.

A triol having 3 or more and 6 or less carbon atoms is used as a triol to be used for obtaining the polyester polyol (1), (2), (3), or (4). Setting the number of carbon atoms of the triol within the range can effectively prevent the penetration of the extracted component from the elastic layer into the surface layer because the setting optimizes the size of a network formed by an intermolecular force between carbonyl groups in a urethane bond and an ester bond. It should be noted that a known triol can be used as long as the diol has 3 or more and 6 or less carbon atoms. Examples thereof include glycerin, 1,2,4-butanetriol, 1,2,5-pentanetriol, 1,2,3-hexanetriol, 1,2,6-hexanetriol, 3-methyl-1,3,5-pentanetriol, and trimethylolpropane.

ε-Caprolactone is used as the lactone to be used for obtaining the polyester polyol (2) or (4) from the viewpoint of the size of the network.

A known polyisocyanate can be used as the polyisocyanate to be used in the present invention. Examples thereof include 4,4'-diphenylmethane diisocyanate (MDI), 1,5-naphthalene diisocyanate, 3,3'-dimethylbiphenyl-4,4'-diisocyanate, xylylene diisocyanate, trimethylhexamethylene diisocyanate, tolylene diisocyanate, naphthylene diisocyanate, p-phenylene diisocyanate, hexamethylene diisocyanate, polymethylene polyphenyl polyisocyanate (polymeric MDI), copolymerized products thereof, and block copolymers or mixtures thereof. From the viewpoint of reactivity, an aromatic polyisocyanate is preferred, 4,4'-diphenylmethane diisocyanate or polymethylene polyphenyl polyisocyanate is more preferred, and 4,4'-diphenylmethane diisocyanate is still more preferred. It should be noted that one kind, or two or more kinds, of polyisocyanates can be used without any particular problem upon production of a hydroxyl group-terminated prepolymer or an isocyanate-terminated prepolymer. The average functional group valence number of the hydroxyl group-terminated prepolymer to be used in the present invention is preferably 4.0 or more and 5.0 or less. Setting the average functional group valence number to 4.0 or more can suppress the penetration of the extracted component from the elastic layer into the surface layer because the setting increases the crosslink density of the urethane resin, and shortens the length of a network formed by an intermolecular force between a urethane bond and a carbonyl group. In addition, setting the average functional group valence number to 5.0 or less can suppress a reduction in crosslink density of the urethane resin because the setting prevents an unreacted hydroxyl group due to steric hindrance from remaining. Accordingly, the length of the network formed by the intermolecular force between the urethane bond and the carbonyl group shortens, and hence the penetration of the extracted component from the elastic layer into the surface layer can be suppressed.

The average functional group valence number of the isocyanate-terminated prepolymer to be used in the present invention is preferably 3.0 or more and 4.0 or less. Setting the average functional group valence number to 3.0 or more can suppress the penetration of the extracted component from the elastic layer into the surface layer because the setting increases the crosslink density of the urethane resin, and shortens the length of the network formed by the intermolecular force between the urethane bond and the carbonyl group. In addition, setting the average functional group valence number to 4.0 or less can suppress the reduction in crosslink density of the urethane resin because the setting prevents an unreacted isocyanate group due to steric hindrance from remaining. Accordingly, the length of the network formed by the intermolecular force between the urethane bond and the carbonyl group shortens, and hence the penetration of the extracted component from the elastic layer into the surface layer can be suppressed.

One kind, or two or more kinds, of polyester polyols can be used without any particular problem upon production of the hydroxyl group-terminated prepolymer. Similarly, one kind, or two or more kinds, of polyester polyols can be used without any particular problem upon production of the isocyanate-terminated prepolymer.

No particular problem arises irrespective of whether the polyester polyol (1) or (2) to be used upon production of the hydroxyl group-terminated prepolymer, and the polyester polyol (3) or (4) to be used upon production of the isocyanate-terminated prepolymer are of the same kind or of different kinds. For example, the polyester polyol (1) may be used for the hydroxyl group-terminated prepolymer and the polyester polyol (4) may be used for the isocyanate-terminated prepolymer. In addition, similarly, the polyisocyanates can be used without any particular problem irrespective of whether the respective polyisocyanates are of the same kind or of different kinds.

The average functional group valence number of each of the polyester polyols (1) to (4) to be used in the present invention is preferably 2.5 or more and 3.4 or less. When the average functional group valence number is set to 2.5 or more, upon crosslinking reaction of any such polyester polyol with the polyisocyanate, a crosslinking form easily develops into a three-dimensional structure and hence the penetration of the extracted component into the surface layer can be suppressed by a network. In addition, when the average functional group valence number is set to 3.4 or less, an unreacted hydroxyl group due to steric hindrance hardly remains upon reaction of the polyester polyol with a sterically large polyisocyanate. Accordingly, the crosslink density of the urethane resin increases and hence the penetration of the extracted component into the surface layer can be suppressed by the network. It should be noted that the average functional group valence number of any such polyester polyol can be adjusted depending on the amount of a triol to be blended upon its production.

In the present invention, the surface layer covering the surface of the elastic layer preferably further contains an acrylic resin having a structure represented by the following structural formula (1), and at least one structure selected from a structure represented by the following structural formula (2) and a structure represented by the following structural formula (3).

Structural formula (1)

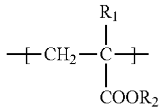

In the structural formula (1), $R_1$ represents a hydrogen atom or a methyl group, and $R_2$ represents a linear or branched alkyl group having 1 to 7 carbon atoms and may contain an oxygen atom between carbon atoms.

Structural formula (2)

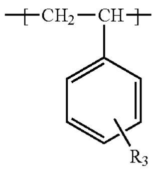

In the structural formula (2), $R_3$ represents a hydrogen atom, or a linear or branched alkyl group having 1 to 4 carbon atoms.

Structural formula (3)

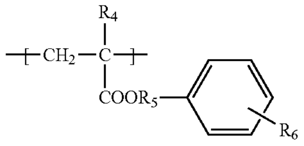

In the structural formula (3), $R_4$ represents a hydrogen atom or a methyl group, $R_5$ represents an alkylene group having 1 to 4 carbon atoms, and $R_6$ represents a hydrogen atom, or a linear or branched alkyl group having 1 to 4 carbon atoms.

A carbonyl group is present in the structural formula (1). Accordingly, when the acrylic resin and the urethane resin according to the present invention are present at close positions, the resins attract each other by virtue of an intermolecular force between the carbonyl group and a carbonyl group in an ester bond present in the urethane resin of the present invention. At this time, when the resins attract each other so as to intersect each other, a new network structure is formed. Further, the acrylic resin becomes sterically large because of the presence of phenyl groups in the structural formula (2) and the structural formula (3), and hence the penetration of the extracted component from the elastic layer into the surface layer can be additionally prevented. It should be noted that the content of the acrylic resin contained in the surface layer is preferably 1 part by mass or more and 20 parts by mass or less, more preferably 2 parts by mass or more and 15 parts by mass or less with respect to the polyol component of the urethane resin.

The surface layer 1*c* preferably has conductivity. Means for imparting the conductivity is, for example, the addition of an ionic conductive agent or conductive fine particles. Of those, the conductive fine particles are suitably used because the conductive fine particles are available at a low cost and each show a small fluctuation in resistance due to an environment, and carbon black is particularly preferred from the viewpoints of conductivity-imparting property and reinforcing property. With regard to the properties of the conductive fine particles, it is preferred that the average particle diameter of primary particles be 18 nm or more and 50 nm or less, and a DBP oil absorption be 50 ml/100 g or more and 160 ml/100 g or less because a balance among their conductivity, hardness, and dispersibility is good. The content of the conductive fine particles is preferably 10 mass % or more and 30 mass % or less with respect to 100 parts by mass of the resin component forming the surface layer.

When the developing roller is required to have a surface roughness, fine particles for roughness control may be added to the surface layer 1*c*. The fine particles for roughness control preferably have a volume average particle diameter of 3 to 20 μm. In addition, the addition amount of the fine particles for roughness control to be added to the surface layer is preferably 1 to 50 parts by mass with respect to 100 parts by mass of the resin solid content of the surface layer. Fine particles of a polyurethane resin, a polyester resin, a polyether resin, a polyamide resin, an acrylic resin, or a phenol resin can be used as the fine particles for roughness control.

A method of forming the surface layer 1*c* covering the surface of the elastic layer is, for example, but not particularly limited to, a coating method such as spray coating, dip coating, or roll coating with a paint. As to the dip coating, such a method involving overflowing the paint from the upper end of a dipping tank as described in Japanese Patent Application Laid-Open No. S57-5047 is preferred as a method of forming the surface layer because it is simple and excellent in production stability.

The electrophotographic member of the present invention is applicable to any one of, for example, a non-contact type developing device and a contact type developing device each using a magnetic one-component developer or a nonmagnetic one-component developer, and a developing device using a two-component developer.

(Electrophotographic Apparatus and Developing Device)

Figure 2:
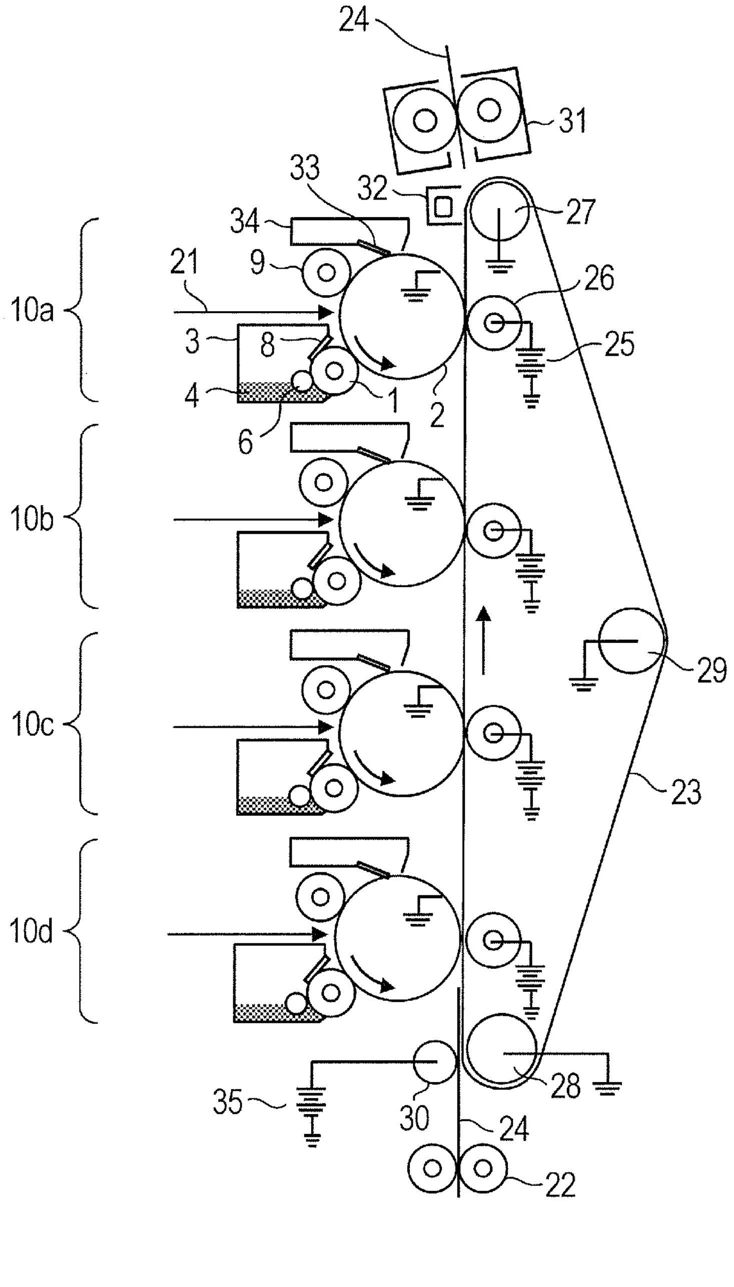
FIG. 2 is a schematic view of an example of an electrophotographic apparatus according to the present invention.

FIG. 2 illustrates an example of an electrophotographic apparatus in which the electrophotographic member of the present invention can be used. It should be noted that in this example, the electrophotographic member of the present invention is used as a developing roller 1. A color electrophotographic apparatus illustrated in the schematic view of FIG. 2 has developing devices (for respective colors) (10*a* to 10*d*) provided for respective color toners, i.e., yellow Y, magenta M, cyan C, and black BK in tandem.

The developing devices have the same basic constitution, though their specifications differ from one another to some extent depending on the characteristics of the respective color toners. A drum-shaped electrophotographic photosensitive member (hereinafter abbreviated as "photosensitive drum") 2 that rotates in a direction indicated by an arrow is provided in the developing device. Provided around the photosensitive drum are a charging roller 9 for uniformly charging the photosensitive drum 2, a exposing unit for irradiating the uniformly charged photosensitive drum 2 with laser light 21 to form an electrostatic latent image, and a hopper 3 for supplying toner to the photosensitive drum 2 on which the electrostatic latent image has been formed to develop the electrostatic latent image. Further provided is a transfer member having a transfer roller 26 for transferring the toner image on the photosensitive drum 2 onto a recording medium (transfer material) 24 such as paper, which is fed by a sheet feeding roller 22 and conveyed by a conveying belt 23, by applying the voltage of a bias power source 25 from the rear surface of the recording medium 24.

The conveying belt 23 is suspended by a driver roller 27, a driven roller 28, and a tension roller 29, and is controlled to move in synchronization with the respective image forming portions to convey the recording medium 24 so that the toner images formed in the image forming portions may be sequentially transferred onto the recording medium 24 in a superimposed manner. It should be noted that the recording medium 24 is electrostatically adsorbed and conveyed by the conveying belt 23 through the action of an adsorbing roller 30 to which a voltage has been applied from a bias power source 35, the adsorbing roller 30 being provided immediately before the conveying belt 23.

In the electrophotographic apparatus, the photosensitive drum 2 and the developing roller 1 that is the electrophotographic member of the present invention are placed so as to be in contact with each other, and the photosensitive drum 2 and the developing roller 1 rotate in the same direction at the site of contact therebetween. Further, a fixing device 31 for fixing the toner images transferred onto the recording medium 24 in a superimposed manner through heating or the like, and a conveying device (not shown) for discharging the recording medium on which the images have been formed to the outside of the apparatus are provided in the electrophotographic apparatus. It should be noted that the recording medium 24 is peeled from the conveying belt 23 through the action of a peeling device 32 and then conveyed to the fixing device 31. Meanwhile, a cleaning member having a cleaning blade 33 for removing transfer residual toner remaining on the photosensitive member 2 without being transferred, and a waste toner container 34 for storing toner scraped from the photosensitive member are provided in the developing device. The photosensitive drum 2 that has been cleaned is adapted to wait in an image-formable state.

Figure 3:
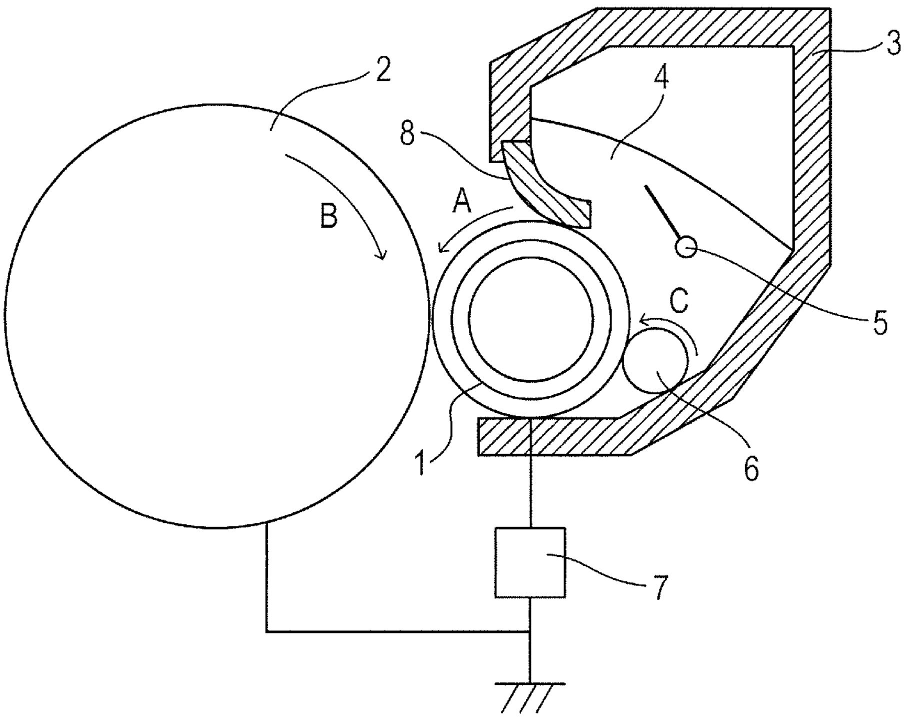
FIG. 3 is a schematic view of an example of a developing device according to the present invention.

Subsequently, FIG. 3 illustrates an example of each of the developing devices. In the developing device, the photosensitive drum 2 as an electrostatic latent image bearing member for bearing an electrostatic latent image formed by a known process is rotated in a direction indicated by an arrow B. A stirring blade 5 for stirring a nonmagnetic one-component toner 4 is provided in the hopper 3 as a toner container. A toner supplying member 6 for supplying the toner 4 to the developing roller 1 of the present invention and scraping the toner 4 present on the surface of the developing roller after development abuts on the developing roller. The toner supplying member 6 as a toner supplying roller rotates in the same direction (direction indicated by an arrow C) as that of the developing roller 1 (direction indicated by an arrow A), whereby the surface of the toner supplying member 6 for supplying the toner and scraping the toner moves in the direction counter to that of the surface of the developing roller 1. Thus, the one-component nonmagnetic toner with nonmagnetic toner supplied from the hopper 3 is supplied to the developing roller. A developing bias voltage is applied by a developing bias power source 7 to the developing roller for moving the one-component nonmagnetic toner 4 with the nonmagnetic toner carried by the developing roller.

An elastic roller member made of a resin, rubber, sponge, or the like is preferred as the toner supplying member 6 for supplying the toner and scraping the toner. The toner on the surface of the developing roller that has not been caused to migrate toward the photosensitive drum 2 so as to be used in development is scraped from the surface of the developing roller once by the toner supplying member 6, whereby the occurrence of immobile toner on the developing roller is inhibited and the charging of the toner is uniformized.

A toner regulating member 8 (also referred to as "developer layer thickness regulating member") made of a material having rubber elasticity such as a urethane rubber or a silicone rubber, or of a material having metal elasticity such as phosphor bronze or stainless steel can be used as a member for regulating the layer thickness of the nonmagnetic one-component toner 4 on the developing roller. An additionally thin toner layer can be formed on the developing roller by bringing the toner regulating member 8 into abutment with the surface of the developing roller in a posture opposite to the rotation direction of the developing roller.

EXAMPLES

Production of Elastic Roller

First, elastic rollers 1 to 3 each having an elastic layer provided on the peripheral surface of a support were produced. It should be noted that the shape of each of the elastic rollers is as described below.

Diameter of support: 6 mm

Thickness of elastic layer: 3.0 mm (Elastic Roller 1)

A solid mandrel made of stainless steel (SUS304) was used as an electro-conductive support. A silane coupling primer (trade name: DY35-051, Dow Corning Toray Co., Ltd.) was applied to the peripheral surface of the mandrel and then baked at a temperature of 180° C. for 20 minutes.

Next, the mandrel was concentrically placed in a cylindrical mold, and then a liquid material for forming an elastic layer into which materials shown in Table 1 below had been dispersed was filled into a gap between the inner peripheral surface of the mold and the peripheral surface of the mandrel, followed by heating at a temperature of 130° C. for 30 minutes. After having been cooled, the mandrel was removed from the mold. Further, the mandrel was heated in an oven heated to a temperature of 200° C. for 5 hours to produce the elastic roller 1.

TABLE 1

| | |
|---|---|
| Silicone rubber: XE15-645 A (trade name, Momentive Performance Materials Japan LLC) | 50 parts by mass |
| Silicone rubber: XE15-645 B (trade name, Momentive Performance Materials Japan LLC) | 50 parts by mass |
| Carbon black: DENKABLACK (powder) (trade name, DENKI KAGAKU KOGYO KABUSHIKI KAISHA) | 8 parts by mass |

(Elastic Roller 2)

Materials shown in Table 2 below were sufficiently kneaded, and then the kneaded materials were provided on the same solid mandrel as that of the elastic roller 1 with a crosshead extruder and heated at 170° C. for 40 minutes to produce the elastic roller 2.

TABLE 2

| | |
|---|---|
| Silicone rubber: TSE270-4U (trade name, Momentive Performance Materials Japan LLC) | 93 parts by mass |
| Crosslinking agent: TC-8 (trade name, Momentive Performance Materials Japan LLC) | 7 parts by mass |
| Carbon black: DENKABLACK (trade name, DENKI KAGAKU KOGYO KABUSHIKI KAISHA) | 13 parts by mass |

(Elastic Roller 3)

Materials shown in Table 3 below were sufficiently kneaded, and then the kneaded materials were provided on the same solid mandrel as that of the elastic roller 1 with a crosshead extruder and heated at 140° C. for 60 minutes to produce the elastic roller 3.

TABLE 3

| | |
|---|---|
| Epichlorohydrin-ethylene oxide-allyl glycidyl ether terpolymer: EPICHLOMER CG (trade name, DAISO CO., LTD.) | 100 parts by mass |
| Stearic acid: Stearic Acid S (trade name, manufactured by Kao Corporation) | 1 part by mass |
| Calcium carbonate: NANOX #30 (trade name, Maruo Calcium Co., Ltd.) | 50 parts by mass |
| Plasticizer: POLYCIZER W-1600 (trade name, DIC Corporation) | 8 parts by mass |
| Carbon black: TOKABLACK #7360SB (trade name, TOKAI CARBON CO., LTD.) | 2 parts by mass |
| Sulfur: dispersible sulfur: Sulfax 200S (trade name, manufactured by TSURUMI CHEMICAL INDUSTRY CO., LTD.) | 1.2 parts by mass |
| Di-2-benzothiazolyl tetrasulfide: NOCCELER DM (trade name, OUCHI SHINKO CHEMICAL INDUSTRIAL CO., LTD.) | 1.0 part by mass |
| Dipentamethylenethiuram tetrasulfide: NOCCELER TRA (trade name, OUCHI SHINKO CHEMICAL INDUSTRIAL CO., LTD.) | 1.0 part by mass |

(Preparation of Surface Layer)

(Production of Polyester Polyol (2))

80.4 Mass percent of ϵ-caprolactone, 19.6 mass % of trimethylolpropane, and titanium tetra-n-butoxide as a catalyst were added to a flask made of glass with a stirring machine, and were then subjected to a reaction under a nitrogen atmosphere at 180° C. for 7 hours and then at 200° C. for 3 hours. The resultant was naturally cooled to provide the polyester polyol (2) having an average functional group valence number of 3.5.

(Production of Polyester Polyol (4))

95.7 Mass percent of ϵ-caprolactone, 4.3 mass % of trimethylolpropane, and titanium tetra-n-butoxide as a catalyst were added to a flask made of glass with a stirring machine, and were then subjected to a reaction under a nitrogen atmosphere at 180° C. for 7 hours and then at 200° C. for 3 hours. The resultant was naturally cooled to provide the polyester polyol (4) having an average functional group valence number of 2.4.

(Production of Hydroxyl Group-Terminated Prepolymer)

Materials shown in Table 4 below (blending ratio (on a mass basis) of isocyanate; 24A100:D101=0.38:0.62) were blended so that a ratio "OH:NCO" became 2:1. The materials were vigorously stirred at 100° C. for 6 hours to provide a hydroxyl group-terminated prepolymer having an average functional group valence number of 4.5.

TABLE 4

| The polyester polyol (2) |
|---|
| Polyfunctional isocyanate: DURANATE 24A100 (trade name, manufactured by Asahi Kasei Chemicals Corp.) |
| Difunctional isocyanate: DURANATE D101 (trade name, manufactured by Asahi Kasei Chemicals Corp.) |

(Production of Isocyanate-Terminated Prepolymer)

Materials shown in Table 5 below (blending ratio (on a mass basis) of isocyanate; 24A100:D101=0.38:0.62) were blended so that a ratio "OH:NCO" became 1:2. The materials were vigorously stirred at 100° C. for 6 hours to provide an isocyanate-terminated prepolymer having an average functional group valence number of 3.5.

TABLE 5

| The polyester polyol (4) |
|---|
| Polyfunctional isocyanate: DURANATE 24A100 (trade name, manufactured by Asahi Kasei Chemicals Corp.) |
| Difunctional isocyanate: DURANATE D101 (trade name, manufactured by Asahi Kasei Chemicals Corp.) |

(Production of Acrylic Resin)

200 Parts by mass of dry methyl ethyl ketone were loaded into a reaction vessel mounted with a stirring device, a temperature gauge, a reflux tube, and a dropping device, and then a temperature in the vessel was increased to 90° C. under a nitrogen atmosphere. Next, a mixture of 50.0 parts by mass of n-butyl methacrylate, 50.0 parts by mass of styrene, and 0.2 part by mass of a polymerization initiator (trade name, Kayaester O; manufactured by Kayaku Akzo Corporation) was gradually dropped over 1 hour, and then the whole was refluxed under heat for 3 hours while the temperature was kept at 90° C. Next, the resultant was left standing to cool so that its temperature was reduced to room temperature, whereby an acrylic resin was obtained.

Example 1

A surface layer was provided on the peripheral surface of the elastic roller 1 as described below.

Materials shown in Table 6 below were mixed and dispersed, and were then loaded into an overflow-type circulating applying device. The elastic roller 1 was immersed in the circulating applying device and then lifted, followed by air drying for 60 minutes. After that, the resultant was heated in an oven heated to a temperature of 160° C. for 2 hours, whereby a surface layer having a thickness of 16 μm was provided.

TABLE 6

| | |
|---|---|
| The hydroxyl group-terminated prepolymer | 100 parts by mass |
| The isocyanate-terminated prepolymer | 30 parts by mass |
| Carbon black: MA100 | 20 parts by mass |
| Urethane resin particles: ARTPEARL C-400 Transparent | 15 parts by mass |
| Methyl ethyl ketone (MEK) | 200 parts by mass |

The electrophotographic member according to Example 1 thus obtained was used as a developing roller and evaluated for the following items.

(Hardness Measurement)

The developing roller obtained in Example 1 was left to stand under an environment having a temperature of 23° C. and a relative humidity of 55% for 24 hours, and then its hardness was measured. It should be noted that a Microrubber Hardness Meter Type A (manufactured by KOBUNSHI KEIKI CO., LTD.) was used as a measuring device.

(Evaluation for Streak-Like Image Density Unevenness)

The developing roller obtained in Example 1 was mounted on a process cartridge for a laser printer (trade name: LBP7700C, manufactured by Canon Inc.). The developing roller mounted on the process cartridge abuts on an elastic blade as a developer layer thickness regulating member. The process cartridge was left under an environment having a temperature of 40° C. and a relative humidity of 95% for 60 days (severe standing). After that, the process cartridge was mounted on the laser printer. Under the same environment, a black solid image was output on one sheet, and subsequently, two kinds of halftone images were each output on one sheet. It should be noted that the following two kinds were used as the two kinds of halftone images: an image having a density measured with a spectral densitometer X-Rite 504 (trade name, S.D.G. K.K.) of 0.4 and an image having a density of 0.8. The resultant black solid image and two halftone images were visually observed, and then whether the abutment portion with the elastic blade appeared as streak-like density unevenness was evaluated by the following criteria.

A: No streak-like density unevenness is observed in any one of the images.

B: Streak-like density unevenness is slightly observed only in the black solid image.

C: Streak-like density unevenness is slightly observed in the black solid image and the halftone image having a density of 0.8.

D: Streak-like density unevenness is slightly observed in each of the images.

E: Streak-like density unevenness is observed in each of the images.

F: Streak-like density unevenness is clearly observed in each of the images.

In addition, the hardness of the abutment portion with the elastic blade in the developing roller after the severe standing was measured by the same method as that in the section "hardness measurement." Table 8 shows the results.

Examples 2 to 10

Developing rollers were produced and evaluated in the same manner as in Example 1 except that: elastic rollers shown in Table 8 were used; and surface layers were produced by using compounds shown in Table 8 in blending amounts shown therein. Table 8 shows the results.

It should be noted that abbreviations in the columns "dicarboxylic acid," "diol," and "triol" in Table 8 each represent a compound name shown in Table 7 below.

TABLE 7

| | |
|---|---|
| PCL | ϵ-Caprolactone |
| BA | Adipic acid |
| HA | Suberic acid |
| BD | 1,4-Butanediol |
| PD | 1,5-Pentanediol |
| HD | 1,6-Hexanediol |
| G | Glycerin |
| BT | 1,2,4-Butanetriol |
| TMP | Trimethylolpropane |

Examples 11 to 20

Developing rollers were produced and evaluated in the same manner as in Example 1 except that: elastic rollers shown in Table 9 were used; and surface layers were produced by using compounds shown in Table 9 in blending amounts shown therein. Table 9 shows the results.

Examples 21 to 30

Developing rollers were produced and evaluated in the same manner as in Example 1 except that: elastic rollers shown in Table 10 were used; and surface layers were produced by using compounds shown in Table 10 in blending amounts shown therein. Table 10 shows the results.

Examples 31 to 40

Developing rollers were produced and evaluated in the same manner as in Example 1 except that: elastic rollers shown in Table 11 were used; and surface layers were produced by using compounds shown in Table 11 in blending amounts shown therein. Table 11 shows the results.

Examples 41 and 42

Developing rollers were produced and evaluated in the same manner as in Example 1 except that: elastic rollers shown in Table 12 were used; and surface layers were produced by using compounds shown in Table 12 in blending amounts shown therein. Table 12 shows the results.

Examples 43 to 50

Developing rollers were produced and evaluated in the same manner as in Example 1 except that: elastic rollers shown in Table 12 were used; the following isocyanate compounds were used as isocyanates; and surface layers were produced by using compounds shown in Table 12 in blending amounts shown therein. Table 12 shows the results.

It should be noted that the following MDIs were each used as an MDI in the column "isocyanate" in Table 12. Polyfunctional isocyanate (polymeric MDI): Lupranate M20S (trade name, manufactured by BASF INOAC Polyurethanes Ltd.) Difunctional isocyanate (MDI): Lupranate Mich. (trade name, manufactured by BASF INOAC Polyurethanes Ltd.)

Examples 51 to 60

Developing rollers were produced and evaluated in the same manner as in Example 1 except that: elastic rollers shown in Table 13 were used; the MDIs were used as isocyanates; and surface layers were produced by using compounds shown in Table 13 in blending amounts shown therein. Table 13 shows the results.

Examples 61 to 63

Developing rollers were produced and evaluated in the same manner as in Example 1 except that: elastic rollers shown in Table 14 were used; the MDIs were used as isocyanates; and surface layers were produced by using compounds shown in Table 14 in blending amounts shown therein. Table 14 shows the results.

Examples 64 to 70

Developing rollers were produced and evaluated in the same manner as in Example 1 except that: elastic rollers shown in Table 14 were used; the MDIs were used as isocyanates; and surface layers were produced by using compounds shown in Table 14 in blending amounts shown therein and by adding parts by mass of the acrylic resin produced in the section "production of acrylic resin." Table 14 shows the results.

Examples 71 and 72

Developing rollers were produced and evaluated in the same manner as in Example 1 except that: elastic rollers shown in Table 15 were used; the MDIs were used as isocyanates; and surface layers were produced by using compounds shown in Table 15 in blending amounts shown therein and by adding 5 parts by mass of the acrylic resin produced in the section "production of acrylic resin." Table 15 shows the results.

Examples 73 to 79

Developing rollers were produced and evaluated in the same manner as in Example 1 except that: elastic rollers shown in Table 15 were used; and surface layers were produced by using compounds shown in Table 15 in blending amounts shown therein. Table 15 shows the results.

Comparative Examples 1 to 6

Developing rollers were produced and evaluated in the same manner as in Example 1 except that: elastic rollers shown in Table 16 were used; and surface layers were produced by using compounds shown in Table 16 in blending amounts shown therein. Table 16 shows the results.

Comparative Examples 7 to 11

Developing rollers were produced and evaluated in the same manner as in Example 1 except that: elastic rollers shown in Table 17 were used; and surface layers were produced by using compounds shown in Table 17 in blending amounts shown therein. Table 17 shows the results.

Comparative Example 12

A developing roller was produced and evaluated in the same manner as in Example 1 except that: an elastic roller shown in Table 18 was used; a PPG polyether polyol was used instead of a polyester polyol; and a surface layer was produced by using compounds shown in Table 18 in blending amounts shown therein. Table 18 shows the results.

Comparative Example 13

A developing roller was produced and evaluated in the same manner as in Example 1 except that: an elastic roller shown in Table 18 was used; a PTMG polyether polyol was used instead of a polyester polyol; and a surface layer was produced by using compounds shown in Table 18 in blending amounts shown therein. Table 18 shows the results.

Comparative Examples 14 and 15

Developing rollers were produced and evaluated in the same manner as in Example 1 except that: no hydroxyl group-terminated prepolymers were produced and the respective compounds were used; and surface layers were produced by using compounds shown in Table 18 in blending amounts shown therein. Table 18 shows the results.

Comparative Examples 16 and 17

Developing rollers were produced and evaluated in the same manner as in Example 1 except that: no isocyanate-terminated prepolymers were produced and the respective compounds were used; and surface layers were produced by using compounds shown in Table 18 in blending amounts shown therein. Table 18 shows the results.

It should be noted that, in Tables 8 to 18, "wt %" refers to "mass %."

TABLE 8

| | | Example | | | | | | | | | |
|---|---|---|---|---|---|---|---|---|---|---|---|
| | | 1 | 2 | 3 | 4 | 5 | 6 | 7 | 8 | 9 | 10 |
| | Elastic roller | 1 | 2 | 1 | 1 | 2 | 3 | 3 | 1 | 2 | 2 |
| Hydroxyl group-terminated prepolymer | Dicarboxylic acid | PCL | PCL | PCL | BA | BA | BA | BA | BA | BA | BA |
| | Diol | | | | HD | HD | HD | PD | PD | PD | BD |
| | Triol | TMP | G | BT | TMP | G | BT | TMP | G | BT | TMP |
| | Isocyanate | HDI | HDI | HDI | HDI | HDI | HDI | HDI | HDI | HDI | HDI |
| | Dicarboxylic acid (wt %) | 80.4 | 97.0 | 96.5 | 52.8 | 54.7 | 54.3 | 57.8 | 57.2 | 56.9 | 58.5 |
| | Diol (wt %) | | | | 36.2 | 37.5 | 38.5 | 40.2 | 34.6 | 35.6 | 31.7 |
| | Triol (wt %) | 19.6 | 3.0 | 3.5 | 11.1 | 7.9 | 7.2 | 2.0 | 8.2 | 7.5 | 9.8 |
| | Average functional group valence number of polyester polyol | 3.5 | 2.4 | 2.4 | 3.9 | 3.9 | 3.5 | 2.4 | 3.9 | 3.5 | 3.5 |
| | Blending ratio of polyfunctional isocyanate | 0.38 | 1.00 | 1.00 | 0.38 | 0.38 | 0.38 | 1.00 | 0.38 | 0.38 | 0.38 |
| | Blending ratio of difunctional isocyanate | 0.62 | 0.00 | 0.00 | 0.62 | 0.62 | 0.62 | 0.00 | 0.62 | 0.62 | 0.62 |
| | Average functional group valence number of polyol | 4.5 | 4.0 | 4.0 | 5.0 | 5.0 | 4.5 | 4.0 | 5.0 | 4.5 | 4.5 |
| Isocyanate-terminated prepolymer | Dicarboxylic acid | PCL | PCL | PCL | BA | BA | BA | BA | BA | BA | BA |
| | Diol | | | | HD | HD | HD | PD | PD | PD | BD |
| | Triol | TMP | G | BT | TMP | G | BT | TMP | G | BT | TMP |
| | Isocyanate | HDI | HDI | HDI | HDI | HDI | HDI | HDI | HDI | HDI | HDI |
| | Dicarboxylic acid (wt %) | 95.7 | 84.8 | 99.3 | 53.1 | 55.3 | 54.2 | 57.8 | 58.2 | 58.3 | 61.1 |
| | Diol (wt %) | | | | 37.4 | 44.5 | 38.2 | 40.2 | 40.4 | 41.3 | 36.8 |
| | Triol (wt %) | 4.3 | 15.2 | 0.7 | 9.5 | 0.3 | 7.6 | 2.0 | 1.4 | 0.3 | 2.1 |
| | Average functional group valence number of polyester polyol | 2.4 | 3.6 | 2.2 | 3.6 | 2.2 | 3.6 | 2.4 | 2.4 | 2.2 | 2.4 |
| | Blending ratio of polyfunctional isocyanate | 1.00 | 0.15 | 0.77 | 0.15 | 0.77 | 0.15 | 1.00 | 1.00 | 0.77 | 1.00 |

TABLE 8-continued

| | | Example | | | | | | | | | |
|---|---|---|---|---|---|---|---|---|---|---|---|
| | | 1 | 2 | 3 | 4 | 5 | 6 | 7 | 8 | 9 | 10 |
| | Blending ratio of difunctional isocyanate | 0.00 | 0.85 | 0.23 | 0.85 | 0.23 | 0.85 | 0.00 | 0.00 | 0.23 | 0.00 |
| | Average functional group valence number of isocyanate | 3.5 | 4.0 | 3.0 | 4.0 | 3.0 | 4.0 | 3.5 | 3.5 | 3.0 | 3.5 |
| Evaluation | Hardness (before severe standing) | 55.1 | 55.2 | 60.9 | 48.9 | 55.1 | 52.2 | 58.1 | 51.9 | 57.8 | 54.9 |
| | Hardness (after severe standing) | 54.0 | 54.1 | 59.7 | 47.9 | 54.0 | 51.2 | 56.9 | 50.9 | 56.6 | 53.8 |
| | Image rank | C | C | C | C | C | C | C | C | C | C |

TABLE 9

| | | Example | | | | | | | | | |
|---|---|---|---|---|---|---|---|---|---|---|---|
| | | 11 | 12 | 13 | 14 | 15 | 16 | 17 | 18 | 19 | 20 |
| | Elastic roller | 3 | 1 | 1 | 2 | 3 | 3 | 1 | 2 | 2 | 1 |
| Hydroxyl group-terminated prepolymer | Dicarboxylic acid | BA | BA | HA | HA | HA | HA | HA | HA | HA | HA |
| | Diol | BD | BD | HD | HD | HD | PD | PD | PD | BD | BD |
| | Triol | G | BT | TMP | G | BT | TMP | G | BT | TMP | G |
| | Isocyanate | HDI | HDI | HDI | HDI | HDI | HDI | HDI | HDI | HDI | HDI |
| | Dicarboxylic acid (wt %) | 61.5 | 61.4 | 57.1 | 59.0 | 58.6 | 62.0 | 61.4 | 61.1 | 62.7 | 65.6 |
| | Diol (wt %) | 37.0 | 36.9 | 32.9 | 33.9 | 34.9 | 36.2 | 31.2 | 32.1 | 28.5 | 33.1 |
| | Triol (wt %) | 1.5 | 1.7 | 10.0 | 7.1 | 6.5 | 1.8 | 7.4 | 6.8 | 8.8 | 1.3 |
| | Average functional group valence number of polyester polyol | 2.4 | 2.4 | 3.9 | 3.9 | 3.5 | 2.4 | 3.9 | 3.5 | 3.5 | 2.4 |
| | Blending ratio of polyfunctional isocyanate | 1.00 | 1.00 | 0.38 | 0.38 | 0.38 | 1.00 | 0.38 | 0.38 | 0.38 | 1.00 |
| | Blending ratio of difunctional isocyanate | 0.00 | 0.00 | 0.62 | 0.62 | 0.62 | 0.00 | 0.62 | 0.62 | 0.62 | 0.00 |
| | Average functional group valence number of polyol | 4.0 | 4.0 | 5.0 | 5.0 | 4.5 | 4.0 | 5.0 | 4.5 | 4.5 | 4.0 |
| Isocyanate-terminated prepolymer | Dicarboxylic acid | BA | BA | HA | HA | HA | HA | HA | HA | HA | HA |
| | Diol | BD | BD | HD | HD | HD | PD | PD | PD | BD | BD |
| | Triol | G | BT | TMP | G | BT | TMP | G | BT | TMP | G |
| | Isocyanate | HDI | HDI | HDI | HDI | HDI | HDI | HDI | HDI | HDI | HDI |
| | Dicarboxylic acid of polyol (wt %) | 60.3 | 61.8 | 57.5 | 59.6 | 58.5 | 62.0 | 62.4 | 62.5 | 65.2 | 64.4 |
| | Diol (wt %) | 32.4 | 37.9 | 33.9 | 40.2 | 34.6 | 36.2 | 36.4 | 37.2 | 32.9 | 29.0 |
| | Triol (wt %) | 7.4 | 0.4 | 8.6 | 0.2 | 6.9 | 1.8 | 1.2 | 0.3 | 1.9 | 6.6 |
| | Average functional group valence number of polyester polyol | 3.6 | 2.2 | 3.6 | 2.2 | 3.6 | 2.4 | 2.4 | 2.2 | 2.4 | 3.6 |
| | Blending ratio of polyfunctional isocyanate | 0.15 | 0.77 | 0.15 | 0.77 | 0.15 | 1.00 | 1.00 | 0.77 | 1.00 | 0.15 |
| | Blending ratio of difunctional isocyanate | 0.85 | 0.23 | 0.85 | 0.23 | 0.85 | 0.00 | 0.00 | 0.23 | 0.00 | 0.85 |
| | Average functional group valence number of isocyanate | 4.0 | 3.0 | 4.0 | 3.0 | 4.0 | 3.5 | 3.5 | 3.0 | 3.5 | 4.0 |
| Evaluation of electrophotographic roller | Hardness (before severe standing) | 54.8 | 60.9 | 48.9 | 55.1 | 51.9 | 58.2 | 51.8 | 57.8 | 54.8 | 55.1 |
| | Hardness (after severe standing) | 53.7 | 59.7 | 47.9 | 54.0 | 50.9 | 57.0 | 50.8 | 56.6 | 53.7 | 54.0 |
| | Image rank | C | C | C | C | C | C | C | C | C | C |

TABLE 10

| | | Example | | | | | | | | | |
|---|---|---|---|---|---|---|---|---|---|---|---|
| | | 21 | 22 | 23 | 24 | 25 | 26 | 27 | 28 | 29 | 30 |
| | Elastic roller | 3 | 2 | 3 | 1 | 2 | 3 | 1 | 3 | 1 | 2 |
| Hydroxyl group-terminated prepolymer | Dicarboxylic acid | HA | PCL | PCL | PCL | BA | BA | BA | BA | BA | BA |
| | Diol | BD | | | | HD | HD | HD | PD | PD | PD |
| | Triol | BT | TMP | G | BT | TMP | G | BT | TMP | G | BT |
| | Isocyanate | HDI | HDI | HDI | HDI | HDI | HDI | HDI | HDI | HDI | HDI |
| | Dicarboxylic acid (wt %) | 63.4 | 97.3 | 98.2 | 97.9 | 54.9 | 54.8 | 54.0 | 54.7 | 57.0 | 56.2 |
| | Diol (wt %) | 27.8 | | | | 43.2 | 38.9 | 37.0 | 32.2 | 33.6 | 33.1 |
| | Triol (wt %) | 8.8 | 2.7 | 1.8 | 2.1 | 1.9 | 6.3 | 8.9 | 13.1 | 9.4 | 10.6 |
| | Average functional group valence number of polyester polyol | 3.9 | 2.3 | 2.3 | 2.3 | 2.4 | 3.5 | 3.9 | 4.2 | 4.2 | 4.2 |

TABLE 10-continued

| | | Example 21 | 22 | 23 | 24 | 25 | 26 | 27 | 28 | 29 | 30 |
|---|---|---|---|---|---|---|---|---|---|---|---|
| | Blending ratio of polyfunctional isocyanate | 0.38 | 0.77 | 0.77 | 0.77 | 1.00 | 0.38 | 0.38 | 0.42 | 0.42 | 0.42 |
| | Blending ratio of difunctional isocyanate | 0.62 | 0.23 | 0.23 | 0.23 | 0.00 | 0.62 | 0.62 | 0.58 | 0.58 | 0.58 |
| | Average functional group valence number of polyol | 5.0 | 3.5 | 3.5 | 3.5 | 4.0 | 4.5 | 5.0 | 5.5 | 5.5 | 5.5 |
| Isocyanate-terminated prepolymer | Dicarboxylic acid | HA | PCL | PCL | PCL | BA | BA | BA | BA | BA | BA |
| | Diol | BD | | | | HD | HD | HD | PD | PD | PD |
| | Triol | BT | TMP | G | BT | TMP | G | BT | TMP | G | BT |
| | Isocyanate | HDI | HDI | HDI | HDI | HDI | HDI | HDI | HDI | HDI | HDI |
| | Dicarboxylic acid of polyol (wt %) | 65.8 | 79.2 | 97.0 | 99.3 | 53.1 | 54.8 | 54.2 | 55.6 | 58.2 | 58.3 |
| | Diol (wt %) | 33.9 | | | | 37.4 | 38.5 | 38.2 | 34.5 | 40.4 | 41.3 |
| | Triol (wt %) | 0.3 | 20.8 | 3.0 | 0.7 | 9.5 | 6.7 | 7.6 | 9.9 | 1.4 | 0.3 |
| | Average functional group valence number of polyester polyol | 2.2 | 3.6 | 2.4 | 2.2 | 3.6 | 3.6 | 3.6 | 3.6 | 2.4 | 2.2 |
| | Blending ratio of polyfunctional isocyanate | 0.77 | 0.15 | 1.00 | 0.77 | 0.49 | 0.49 | 0.49 | 0.15 | 1.00 | 0.77 |
| | Blending ratio of difunctional isocyanate | 0.23 | 0.85 | 0.00 | 0.23 | 0.51 | 0.51 | 0.51 | 0.85 | 0.00 | 0.23 |
| | Average functional group valence number of isocyanate | 3.0 | 4.0 | 3.5 | 3.0 | 4.5 | 4.5 | 4.5 | 4.0 | 3.5 | 3.0 |
| Evaluation of electrophotographic roller | Hardness (before severe standing) | 55.2 | 57.9 | 60.9 | 63.9 | 51.8 | 48.9 | 45.9 | 45.8 | 48.7 | 51.7 |
| | Hardness (after severe standing) | 54.1 | 56.2 | 59.1 | 62.0 | 50.2 | 47.4 | 44.5 | 44.4 | 47.2 | 50.1 |
| | Image rank | C | D | D | D | D | D | D | D | D | D |

TABLE 11

| | | Example 31 | 32 | 33 | 34 | 35 | 36 | 37 | 38 | 39 | 40 |
|---|---|---|---|---|---|---|---|---|---|---|---|
| | Elastic roller | 3 | 2 | 1 | 1 | 2 | 3 | 1 | 3 | 2 | 1 |
| Hydroxyl group-terminated prepolymer | Dicarboxylic acid | BA | BA | BA | HA | HA | HA | HA | HA | HA | HA |
| | Diol | BD | BD | BD | HD | HD | HD | PD | PD | PD | BD |
| | Triol | TMP | G | BT | TMP | G | BT | TMP | G | BT | TMP |
| | Isocyanate | HDI | HDI | HDI | HDI | HDI | HDI | HDI | HDI | HDI | HDI |
| | Dicarboxylic acid (wt %) | 61.1 | 60.4 | 59.2 | 59.3 | 59.5 | 59.4 | 59.4 | 61.3 | 60.5 | 65.2 |
| | Diol (wt %) | 36.8 | 32.7 | 31.0 | 39.6 | 39.8 | 39.3 | 30.1 | 30.3 | 29.9 | 32.9 |
| | Triol (wt %) | 2.1 | 6.9 | 9.8 | 1.0 | 0.7 | 1.4 | 10.4 | 8.4 | 9.6 | 1.9 |
| | Average functional group valence number of polyester polyol | 2.4 | 3.5 | 3.9 | 2.3 | 2.3 | 2.4 | 3.9 | 4.2 | 4.2 | 2.4 |
| | Blending ratio of polyfunctional isocyanate | 1.00 | 0.38 | 0.38 | 0.77 | 0.77 | 1.00 | 0.38 | 0.42 | 0.42 | 1.00 |
| | Blending ratio of difunctional isocyanate | 0.00 | 0.62 | 0.62 | 0.23 | 0.23 | 0.00 | 0.62 | 0.58 | 0.58 | 0.00 |
| | Average functional group valence number of polyol | 4.0 | 4.5 | 5.0 | 3.5 | 3.5 | 4.0 | 5.0 | 5.5 | 5.5 | 4.0 |
| Isocyanate-terminated prepolymer | Dicarboxylic acid | BA | BA | BA | HA | HA | HA | HA | HA | HA | HA |
| | Diol | BD | BD | BD | HD | HD | HD | PD | PD | PD | BD |
| | Triol | TMP | G | BT | TMP | G | BT | TMP | G | BT | TMP |
| | Isocyanate | HDI | HDI | HDI | HDI | HDI | HDI | HDI | HDI | HDI | HDI |
| | Dicarboxylic acid of polyol (wt %) | 61.7 | 61.8 | 61.8 | 57.5 | 59.6 | 58.5 | 59.9 | 61.6 | 62.5 | 65.8 |
| | Diol (wt %) | 37.9 | 37.9 | 37.9 | 33.9 | 40.2 | 34.6 | 31.2 | 32.1 | 37.2 | 33.8 |
| | Triol (wt %) | 0.4 | 0.3 | 0.3 | 8.6 | 0.2 | 6.9 | 9.0 | 6.3 | 0.3 | 0.4 |
| | Average functional group valence number of polyester polyol | 2.2 | 2.2 | 2.2 | 3.6 | 2.2 | 3.6 | 3.6 | 3.6 | 2.2 | 2.2 |
| | Blending ratio of polyfunctional isocyanate | 0.21 | 0.21 | 0.21 | 0.15 | 0.77 | 0.49 | 0.49 | 0.15 | 0.77 | 0.21 |
| | Blending ratio of difunctional isocyanate | 0.79 | 0.79 | 0.79 | 0.85 | 0.23 | 0.51 | 0.51 | 0.85 | 0.23 | 0.79 |
| | Average functional group valence number of isocyanate | 2.5 | 2.5 | 2.5 | 4.0 | 3.0 | 4.5 | 4.5 | 4.0 | 3.0 | 2.5 |
| Evaluation of electrophotographic roller | Hardness (before severe standing) | 64.3 | 61.2 | 58.1 | 58.0 | 64.0 | 51.9 | 46.0 | 45.8 | 51.7 | 63.9 |
| | Hardness (after severe standing) | 62.4 | 59.4 | 56.4 | 56.3 | 62.1 | 50.3 | 44.6 | 44.4 | 50.1 | 62.0 |
| | Image rank | D | D | D | D | D | D | D | D | D | D |

TABLE 12

| | | Example | | | | | | | | | |
|---|---|---|---|---|---|---|---|---|---|---|---|
| | | 41 | 42 | 43 | 44 | 45 | 46 | 47 | 48 | 49 | 50 |
| | Elastic roller | 3 | 2 | 2 | 1 | 2 | 1 | 2 | 3 | 1 | 2 |
| Hydroxyl group-terminated prepolymer | Dicarboxylic acid | HA | HA | PCL | PCL | BA | BA | BA | BA | HA | HA |
| | Diol | BD | BD | | | HD | HD | BD | BD | HD | HD |
| | Triol | G | BT | TMP | G | TMP | G | TMP | G | TMP | G |
| | Isocyanate | HDI | HDI | MDI | MDI | MDI | MDI | MDI | MDI | MDI | MDI |
| | Dicarboxylic acid (wt %) | 64.1 | 65.6 | 97.3 | 98.2 | 55.0 | 55.2 | 58.5 | 60.0 | 56.8 | 58.9 |
| | Diol (wt %) | 28.1 | 33.4 | | | 43.8 | 43.5 | 31.7 | 31.4 | 31.8 | 33.0 |
| | Triol (wt %) | 7.7 | 0.9 | 2.7 | 1.8 | 1.2 | 1.3 | 9.8 | 8.6 | 11.4 | 8.1 |
| | Average functional group valence number of polyester polyol | 3.9 | 2.3 | 2.3 | 2.3 | 2.3 | 2.4 | 3.5 | 3.9 | 4.2 | 4.2 |
| | Blending ratio of polyfunctional isocyanate | 0.38 | 0.77 | 0.77 | 0.77 | 0.77 | 1.00 | 0.38 | 0.38 | 0.42 | 0.42 |
| | Blending ratio of difunctional isocyanate | 0.62 | 0.23 | 0.23 | 0.23 | 0.23 | 0.00 | 0.62 | 0.62 | 0.58 | 0.58 |
| | Average functional group valence number of polyol | 5.0 | 3.5 | 3.5 | 3.5 | 3.5 | 4.0 | 4.5 | 5.0 | 5.5 | 5.5 |
| Isocyanate-terminated prepolymer | Dicarboxylic acid | HA | HA | PCL | PCL | BA | BA | BA | BA | HA | HA |
| | Diol | BD | BD | | | HD | HD | BD | BD | HD | HD |
| | Triol | G | BT | TMP | G | TMP | G | TMP | G | TMP | G |
| | Isocyanate | HDI | HDI | MDI | MDI | MDI | MDI | MDI | MDI | MDI | MDI |
| | Dicarboxylic acid of polyol (wt %) | 65.8 | 65.5 | 79.2 | 97.0 | 55.2 | 54.8 | 58.3 | 60.3 | 57.5 | 59.5 |
| | Diol (wt %) | 33.9 | 33.0 | | | 44.4 | 38.5 | 31.3 | 32.4 | 33.9 | 39.3 |
| | Triol (wt %) | 0.3 | 1.5 | 20.8 | 3.0 | 0.4 | 6.7 | 10.4 | 7.4 | 8.6 | 1.2 |
| | Average functional group valence number of polyester polyol | 2.2 | 2.4 | 3.6 | 2.4 | 2.2 | 3.6 | 3.6 | 3.6 | 3.6 | 2.4 |
| | Blending ratio of polyfunctional isocyanate | 0.21 | 1.00 | 0.15 | 1.00 | 0.77 | 0.49 | 0.49 | 0.49 | 0.15 | 1.00 |
| | Blending ratio of difunctional isocyanate | 0.79 | 0.00 | 0.85 | 0.00 | 0.23 | 0.51 | 0.51 | 0.51 | 0.85 | 0.00 |
| | Average functional group valence number of isocyanate | 2.5 | 3.5 | 4.0 | 3.5 | 3.0 | 4.5 | 4.5 | 4.5 | 4.0 | 3.5 |
| Evaluation of electrophotographic roller | Hardness (before severe standing) | 57.8 | 60.9 | 58.2 | 61.3 | 64.0 | 52.1 | 48.8 | 45.9 | 45.8 | 45.8 |
| | Hardness (after severe standing) | 56.1 | 59.1 | 57.0 | 60.1 | 62.7 | 51.1 | 47.8 | 45.0 | 44.9 | 44.9 |
| | Image rank | D | D | C | C | C | C | C | C | C | C |

TABLE 13

| | | Example | | | | | | | | | |
|---|---|---|---|---|---|---|---|---|---|---|---|
| | | 51 | 52 | 53 | 54 | 55 | 56 | 57 | 58 | 59 | 60 |
| | Elastic roller | 3 | 1 | 2 | 3 | 1 | 1 | 3 | 2 | 2 | 2 |
| Hydroxyl group-terminated prepolymer | Dicarboxylic acid | HA | HA | BA | HA | PCL | PCL | BA | BA | BA | BA |
| | Diol | BD | BD | PD | PD | | | HD | HD | BD | BD |
| | Triol | TMP | G | TMP | G | TMP | G | TMP | G | TMP | G |
| | Isocyanate | MDI | MDI | MDI | MDI | MDI | MDI | MDI | MDI | MDI | MDI |
| | Dicarboxylic acid (wt %) | 61.4 | 65.6 | 55.8 | 61.4 | 85.3 | 93.6 | 54.4 | 55.1 | 59.4 | 60.8 |
| | Diol (wt %) | 26.3 | 33.1 | 34.9 | 31.2 | | | 41.6 | 42.1 | 33.4 | 34.1 |
| | Triol (wt %) | 12.3 | 1.3 | 9.3 | 7.4 | 14.7 | 6.4 | 4.0 | 2.8 | 7.3 | 5.1 |
| | Average functional group valence number of polyester polyol | 4.2 | 2.4 | 3.5 | 3.9 | 3.1 | 2.7 | 2.7 | 2.7 | 3.1 | 3.1 |
| | Blending ratio of polyfunctional isocyanate | 0.42 | 1.00 | 0.38 | 0.38 | 0.65 | 0.70 | 0.70 | 0.70 | 0.65 | 0.65 |
| | Blending ratio of difunctional isocyanate | 0.58 | 0.00 | 0.62 | 0.62 | 0.35 | 0.30 | 0.30 | 0.30 | 0.35 | 0.35 |
| | Average functional group valence number of polyol | 5.5 | 4.0 | 4.5 | 5.0 | 4.5 | 4.0 | 4.0 | 4.0 | 4.5 | 4.5 |
| Isocyanate-terminated prepolymer | Dicarboxylic acid | HA | HA | BA | HA | PCL | PCL | BA | BA | BA | BA |
| | Diol | BD | BD | PD | PD | | | HD | HD | BD | BD |
| | Triol | TMP | G | TMP | G | TMP | G | TMP | G | TMP | G |
| | Isocyanate | MDI | MDI | MDI | MDI | MDI | MDI | MDI | MDI | MDI | MDI |
| | Dicarboxylic acid of polyol (wt %) | 65.8 | 65.8 | 58.3 | 62.5 | 86.7 | 86.6 | 53.9 | 55.1 | 58.7 | 61.4 |
| | Diol (wt %) | 33.8 | 33.9 | 41.3 | 37.2 | | | 40.1 | 43.0 | 32.1 | 36.6 |
| | Triol (wt %) | 0.4 | 0.3 | 0.4 | 0.3 | 13.3 | 13.4 | 6.0 | 1.8 | 9.2 | 2.0 |
| | Average functional group valence number of polyester polyol | 2.2 | 2.2 | 2.2 | 2.2 | 3.0 | 3.4 | 3.0 | 2.5 | 3.4 | 2.5 |
| | Blending ratio of polyfunctional isocyanate | 0.77 | 0.21 | 0.21 | 0.21 | 0.29 | 0.31 | 0.29 | 0.37 | 0.31 | 0.37 |
| | Blending ratio of difunctional | 0.23 | 0.79 | 0.79 | 0.79 | 0.71 | 0.69 | 0.71 | 0.63 | 0.69 | 0.63 |

TABLE 13-continued

| | | Example | | | | | | | | | |
|---|---|---|---|---|---|---|---|---|---|---|---|
| | | 51 | 52 | 53 | 54 | 55 | 56 | 57 | 58 | 59 | 60 |
| | isocyanate | | | | | | | | | | |
| | Average functional group valence number of isocyanate | 3.0 | 2.5 | 2.5 | 2.5 | 3.5 | 4.0 | 3.5 | 3.0 | 4.0 | 3.0 |
| Evaluation of electrophotographic roller | Hardness (before severe standing) | 52.3 | 64.1 | 61.2 | 57.8 | 54.9 | 55.2 | 57.8 | 60.8 | 51.8 | 58.2 |
| | Hardness (after severe standing) | 51.3 | 62.8 | 60.0 | 56.6 | 54.4 | 54.6 | 57.2 | 60.2 | 51.3 | 57.6 |
| | Image rank | C | C | C | C | B | B | B | B | B | B |

TABLE 14

| | | Example | | | | | | | | | |
|---|---|---|---|---|---|---|---|---|---|---|---|
| | | 61 | 62 | 63 | 64 | 65 | 66 | 67 | 68 | 69 | 70 |
| | Elastic roller | 1 | 3 | 1 | 1 | 1 | 3 | 2 | 2 | 2 | 1 |
| Hydroxyl group-terminated prepolymer | Dicarboxylic acid | HA | HA | HA | PCL | PCL | HA | HA | HA | HA | BA |
| | Diol | HD | HD | BD | | | HD | HD | BD | BD | HD |
| | Triol | TMP | G | TMP | TMP | G | TMP | G | TMP | G | TMP |
| | Isocyanate | MDI | MDI | MDI | MDI | MDI | MDI | MDI | MDI | MDI | MDI |
| | Dicarboxylic acid (wt %) | 57.7 | 59.1 | 62.9 | 85.3 | 93.6 | 58.7 | 59.4 | 63.5 | 64.9 | 53.4 |
| | Diol (wt %) | 34.7 | 35.6 | 28.8 | | | 37.7 | 38.1 | 30.0 | 30.6 | 38.3 |
| | Triol (wt %) | 7.6 | 5.3 | 8.3 | 14.7 | 6.4 | 3.6 | 2.5 | 6.5 | 4.6 | 8.4 |
| | Average functional group valence number of polyester polyol | 3.4 | 3.4 | 3.4 | 3.1 | 2.7 | 2.7 | 2.7 | 3.1 | 3.1 | 3.4 |
| | Blending ratio of polyfunctional isocyanate | 0.68 | 0.68 | 0.68 | 0.65 | 0.70 | 0.70 | 0.70 | 0.65 | 0.65 | 0.68 |
| | Blending ratio of difunctional isocyanate | 0.32 | 0.32 | 0.32 | 0.35 | 0.30 | 0.30 | 0.30 | 0.35 | 0.35 | 0.32 |
| | Average functional group valence number of polyol | 5.0 | 5.0 | 5.0 | 4.5 | 4.0 | 4.0 | 4.0 | 4.5 | 4.5 | 5.0 |
| Isocyanate-terminated prepolymer | Dicarboxylic acid | HA | HA | HA | PCL | PCL | HA | HA | HA | HA | BA |
| | Diol | HD | HD | BD | | | HD | HD | BD | BD | HD |
| | Triol | TMP | G | TMP | TMP | G | TMP | G | TMP | G | TMP |
| | Isocyanate | MDI | MDI | MDI | MDI | MDI | MDI | MDI | MDI | MDI | MDI |
| | Dicarboxylic acid of polyol (wt %) | 57.7 | 59.3 | 65.0 | 86.7 | 86.6 | 58.3 | 59.4 | 62.9 | 65.5 | 53.4 |
| | Diol (wt %) | 34.7 | 37.0 | 32.4 | | | 36.3 | 38.9 | 28.8 | 32.7 | 38.3 |
| | Triol (wt %) | 7.6 | 3.8 | 2.6 | 13.3 | 13.4 | 5.4 | 1.6 | 8.3 | 1.8 | 8.4 |
| | Average functional group valence number of polyester polyol | 3.4 | 3.0 | 2.5 | 3.0 | 3.4 | 3.0 | 2.5 | 3.4 | 2.5 | 3.4 |
| | Blending ratio of polyfunctional isocyanate | 0.31 | 0.29 | 0.37 | 0.29 | 0.31 | 0.29 | 0.37 | 0.31 | 0.37 | 0.31 |
| | Blending ratio of difunctional isocyanate | 0.69 | 0.71 | 0.63 | 0.71 | 0.69 | 0.71 | 0.63 | 0.69 | 0.63 | 0.69 |
| | Average functional group valence number of isocyanate | 4.0 | 3.5 | 3.0 | 3.5 | 4.0 | 3.5 | 3.0 | 4.0 | 3.0 | 4.0 |
| Evaluation of electrophotographic roller | Hardness (before severe standing) | 49.1 | 52.3 | 54.8 | 54.9 | 54.8 | 57.9 | 60.9 | 52.3 | 58.1 | 48.8 |
| | Hardness (after severe standing) | 48.6 | 51.8 | 54.3 | 54.9 | 54.8 | 57.9 | 60.9 | 52.3 | 58.1 | 48.8 |
| | Image rank | B | B | B | A | A | A | A | A | A | A |

TABLE 15

| | | Example | | | | | | | | |
|---|---|---|---|---|---|---|---|---|---|---|
| | | 71 | 72 | 73 | 74 | 75 | 76 | 77 | 78 | 79 |
| | Elastic roller | 3 | 1 | 1 | 1 | 1 | 1 | 1 | 1 | 1 |
| Hydroxyl group-terminated prepolymer | Dicarboxylic acid | BA | BA | HA | BA | PCL | BA | PCL | PCL | PCL |
| | Diol | HD | BD | HD | BD | | HD | | | |
| | Triol | G | TMP | TMP | G | TMP | G | TMP | TMP | TMP |
| | Isocyanate | MDI | MDI | MDI | MDI | MDI | MDI | HDI | MDI | HDI |
| | Dicarboxylic acid (wt %) | 54.8 | 58.7 | 58.1 | 60.8 | 85.3 | 54.9 | 85.3 | 81.6 | 81.6 |
| | Diol (wt %) | 39.3 | 32.1 | 35.9 | 34.1 | | 40.5 | | | |
| | Triol (wt %) | 5.9 | 9.2 | 6.0 | 5.1 | 14.7 | 4.6 | 14.7 | 18.4 | 18.4 |
| | Average functional group valence number of polyester polyol | 3.4 | 3.4 | 3.1 | 3.1 | 3.1 | 3.1 | 3.1 | 3.4 | 3.4 |

TABLE 15-continued

| | | Example | | | | | | | | |
|---|---|---|---|---|---|---|---|---|---|---|
| | | 71 | 72 | 73 | 74 | 75 | 76 | 77 | 78 | 79 |
| | Blending ratio of polyfunctional isocyanate | 0.68 | 0.68 | 0.65 | 0.65 | 0.65 | 0.65 | 0.65 | 0.92 | 0.92 |
| | Blending ratio of difunctional isocyanate | 0.32 | 0.32 | 0.35 | 0.35 | 0.35 | 0.35 | 0.35 | 0.08 | 0.08 |
| | Average functional group valence number of polyol | 5.0 | 5.0 | 4.5 | 4.5 | 4.5 | 4.5 | 4.5 | 5.5 | 5.5 |
| Isocyanate-terminated prepolymer | Dicarboxylic acid | BA | BA | BA | HA | BA | PCL | PCL | PCL | PCL |
| | Diol | HD | BD | BD | HD | HD | | | | |
| | Triol | G | TMP | G | TMP | G | TMP | TMP | TMP | TMP |
| | Isocyanate | MDI | MDI | MDI | MDI | MDI | MDI | HDI | MDI | HDI |
| | Dicarboxylic acid of polyol (wt %) | 55.0 | 60.9 | 60.9 | 58.3 | 55.0 | 89.3 | 89.3 | 85.0 | 85.0 |
| | Diol (wt %) | 40.9 | 36.2 | 34.5 | 36.3 | 40.9 | | | | |
| | Triol (wt %) | 4.2 | 2.9 | 4.6 | 5.4 | 4.2 | 10.7 | 10.7 | 15.0 | 15.0 |
| | Average functional group valence number of polyester polyol | 3.0 | 2.5 | 3.0 | 3.0 | 3.0 | 3.0 | 3.0 | 3.4 | 3.4 |
| | Blending ratio of polyfunctional isocyanate | 0.29 | 0.37 | 0.29 | 0.29 | 0.29 | 0.29 | 0.29 | 0.67 | 0.67 |
| | Blending ratio of difunctional isocyanate | 0.71 | 0.63 | 0.71 | 0.71 | 0.71 | 0.71 | 0.71 | 0.33 | 0.33 |
| | Average functional group valence number of isocyanate | 3.5 | 3.0 | 3.5 | 3.5 | 3.5 | 3.5 | 3.5 | 4.5 | 4.5 |
| Evaluation of electrophotographic roller | Hardness (before severe standing) | 51.9 | 54.9 | 54.9 | 55.0 | 55.0 | 55.0 | 55.0 | 43.0 | 43.0 |
| | Hardness (after severe standing) | 51.9 | 54.9 | 54.4 | 54.5 | 54.5 | 54.5 | 53.9 | 42.1 | 41.7 |
| | Image rank | A | A | B | B | B | B | C | C | D |

TABLE 16

| | | Comparative Example | | | | | |
|---|---|---|---|---|---|---|---|
| | | 1 | 2 | 3 | 4 | 5 | 6 |
| | Elastic roller | 1 | 1 | 1 | 1 | 1 | 1 |
| Hydroxyl group-terminated prepolymer | Dicarboxylic acid | Glutaric acid | Glutaric acid | Glutaric acid | BA | HA | Azelaic acid |
| | Diol | HD | PD | BD | 1,2-Octanediol | 1,2-Octanediol | HD |
| | Triol | TMP | TMP | TMP | TMP | TMP | TMP |
| | Isocyanate | MDI | MDI | MDI | MDI | MDI | MDI |
| | Dicarboxylic acid (wt %) | 51.3 | 53.9 | 56.9 | 49.2 | 53.5 | 60.0 |
| | Diol (wt %) | 41.8 | 38.8 | 35.4 | 44.8 | 41.0 | 34.3 |
| | Triol (wt %) | 6.9 | 7.3 | 7.7 | 6.0 | 5.5 | 5.7 |
| | Average functional group valence number of polyester polyol | 3.1 | 3.1 | 3.1 | 3.1 | 3.1 | 3.1 |
| | Blending ratio of polyfunctional isocyanate | 0.65 | 0.65 | 0.65 | 0.65 | 0.65 | 0.65 |
| | Blending ratio of difunctional isocyanate | 0.35 | 0.35 | 0.35 | 0.35 | 0.35 | 0.35 |
| | Average functional group valence number of polyol | 4.5 | 4.5 | 4.5 | 4.5 | 4.5 | 4.5 |
| Isocyanate-terminated prepolymer | Dicarboxylic acid | Glutaric acid | Glutaric acid | Glutaric acid | BA | HA | Azelaic acid |
| | Diol | HD | PD | BD | 1,2-Octanediol | 1,2-Octanediol | HD |
| | Triol | TMP | TMP | TMP | TMP | TMP | TMP |
| | Isocyanate | MDI | MDI | MDI | MDI | MDI | MDI |
| | Dicarboxylic acid of polyol (wt %) | 51.4 | 54.1 | 57.2 | 49.2 | 53.6 | 60.1 |
| | Diol (wt %) | 42.3 | 39.3 | 35.9 | 45.3 | 41.4 | 34.7 |
| | Triol (wt %) | 6.3 | 6.6 | 7.0 | 5.4 | 5.0 | 5.2 |
| | Average functional group valence number of polyester polyol | 3.0 | 3.0 | 3.0 | 3.0 | 3.0 | 3.0 |
| | Blending ratio of polyfunctional isocyanate | 0.29 | 0.29 | 0.29 | 0.29 | 0.29 | 0.29 |
| | Blending ratio of difunctional isocyanate | 0.71 | 0.71 | 0.71 | 0.71 | 0.71 | 0.71 |
| | Average functional group valence number of isocyanate | 3.5 | 3.5 | 3.5 | 3.5 | 3.5 | 3.5 |
| Evaluation of electrophotographic roller | Hardness (before severe standing) | 56.0 | 55.9 | 56.2 | 54.3 | 54.2 | 54.1 |
| | Hardness (after severe standing) | 53.2 | 53.1 | 53.4 | 51.6 | 51.5 | 51.4 |
| | Image rank | F | F | F | F | F | F |

TABLE 17

| | | Comparative Example | | | | |
|---|---|---|---|---|---|---|
| | | 7 | 8 | 9 | 10 | 11 |
| | Elastic roller | 1 | 1 | 1 | 1 | 1 |
| Hydroxyl group-terminated prepolymer | Dicarboxylic acid | Azelaic acid | Azelaic acid | BA | HA | PCL |
| | Diol | PD | BD | Propanediol | Propanediol | |
| | Triol | TMP | TMP | TMP | TMP | 1,2,8-Octanetriol |
| | Isocyanate | MDI | MDI | MDI | MDI | MDI |
| | Dicarboxylic acid (wt %) | 62.5 | 65.3 | 62.7 | 66.7 | 82.8 |
| | Diol (wt %) | 31.5 | 28.5 | 29.7 | 26.5 | |
| | Triol (wt %) | 5.9 | 6.2 | 7.7 | 6.8 | 17.2 |
| | Average functional group valence number of polyester polyol | 3.1 | 3.1 | 3.1 | 3.1 | 3.1 |
| | Blending ratio of polyfunctional isocyanate | 0.65 | 0.65 | 0.65 | 0.65 | 0.65 |
| | Blending ratio of difunctional isocyanate | 0.35 | 0.35 | 0.35 | 0.35 | 0.35 |
| | Average functional group valence number of polyol | 4.5 | 4.5 | 4.5 | 4.5 | 4.5 |
| Isocyanate-terminated prepolymer | Dicarboxylic acid | Azelaic acid | Azelaic acid | BA | HA | PCL |
| | Diol | PD | BD | Propanediol | Propanediol | |
| | Triol | TMP | TMP | TMP | TMP | 1,2,8-Octanetriol |
| | Isocyanate | MDI | MDI | MDI | MDI | MDI |
| | Dicarboxylic acid of polyol (wt %) | 62.7 | 65.5 | 62.9 | 66.9 | 84.3 |
| | Diol (wt %) | 31.9 | 28.9 | 30.1 | 26.9 | |
| | Triol (wt %) | 5.4 | 5.6 | 7.0 | 6.2 | 15.7 |
| | Average functional group valence number of polyester polyol | 3.0 | 3.0 | 3.0 | 3.0 | 3.0 |
| | Blending ratio of polyfunctional isocyanate | 0.29 | 0.29 | 0.29 | 0.29 | 0.29 |
| | Blending ratio of difunctional isocyanate | 0.71 | 0.71 | 0.71 | 0.71 | 0.71 |
| | Average functional group valence number of isocyanate | 3.5 | 3.5 | 3.5 | 3.5 | 3.5 |
| Evaluation of electrophotographic roller | Hardness (before severe standing) | 53.8 | 53.9 | 55.9 | 56.2 | 54.8 |
| | Hardness (after severe standing) | 51.1 | 51.2 | 53.1 | 53.4 | 52.1 |
| | Image rank | F | F | F | F | F |

TABLE 18

| | | Comparative Example | | | | | |
|---|---|---|---|---|---|---|---|
| | | 12 | 13 | 14 | 15 | 16 | 17 |
| | Elastic roller | 1 | 1 | 1 | 1 | 1 | 1 |
| Hydroxyl group-terminated prepolymer | Dicarboxylic acid | — | — | PCL | BA | PCL | BA |
| | Diol | | | | HD | | HD |
| | Triol | — | — | TMP | TMP | TMP | TMP |
| | Isocyanate | MDI | MDI | MDI | MDI | MDI | MDI |
| | Dicarboxylic acid (wt %) | — | — | 85.3 | 53.4 | 85.3 | 55.9 |
| | Diol (wt %) | — | — | | 38.3 | | 35.3 |
| | Triol (wt %) | — | — | 14.7 | 8.4 | 14.7 | 8.7 |
| | Average functional group valence number of polyester polyol | 3.1 | 3.1 | — | — | 3.1 | 3.4 |
| | Blending ratio of polyfunctional isocyanate | 0.65 | 0.65 | 1.00 | 1.00 | 0.65 | 0.68 |
| | Blending ratio of difunctional isocyanate | 0.35 | 0.35 | 0.00 | 0.00 | 0.35 | 0.32 |
| | Average functional group valence number of polyol | 4.5 | 4.5 | — | — | 4.5 | 5.0 |
| Isocyanate-terminated prepolymer | Dicarboxylic acid | — | — | PCL | BA | PCL | BA |
| | Diol | | | | HD | | HD |
| | Triol | — | — | TMP | TMP | TMP | TMP |
| | Isocyanate | MDI | MDI | MDI | MDI | MDI | MDI |
| | Dicarboxylic acid of polyol (wt %) | — | — | 85.6 | 57.6 | 86.7 | 60.9 |
| | Diol (wt %) | — | — | | 39.6 | | 36.2 |
| | Triol (wt %) | — | — | 14.4 | 2.8 | 13.3 | 2.9 |
| | Average functional group valence number of polyester polyol | 3.0 | 3.0 | 3.0 | 2.5 | — | — |
| | Blending ratio of polyfunctional isocyanate | 0.29 | 0.29 | 0.29 | 0.37 | 1.00 | 1.00 |
| | Blending ratio of difunctional isocyanate | 0.71 | 0.71 | 0.71 | 0.63 | 0.00 | 0.00 |
| | Average functional group valence number of isocyanate | 3.5 | 3.5 | 3.5 | 3.0 | — | — |
| Evaluation of electrophotographic roller | Hardness (before severe standing) | 56.8 | 57.3 | 55.3 | 55.2 | 54.8 | 55.1 |
| | Hardness (after severe standing) | 54.0 | 54.4 | 52.5 | 52.4 | 52.1 | 52.3 |
| | Image rank | F | F | F | F | F | F |

In each of Examples 1 to 79, the urethane resin as a reaction product of the hydroxyl group-terminated prepolymer obtained by reacting the polyester polyol (1) or the polyester polyol (2) with the polyisocyanate, and the isocyanate-terminated prepolymer obtained by reacting the polyester polyol (3) or the polyester polyol (4) with the polyisocyanate was used in the surface layer. Accordingly, even when the developing roller was left to stand under a severe environment, reductions in physical properties of the surface layer due to the bleeding of an extracted component from the elastic layer and the penetration of the extracted component into the surface layer were suppressed, and hence a good image was able to be obtained.

On the other hand, in each of Comparative Examples 1 to 3 and Comparative Examples 6 to 8, the size of the network of a network structure formed by an intermolecular force between carbonyl groups in a urethane bond and an ester bond was assumed to enlarge because a dicarboxylic acid except adipic acid and suberic acid was used. Accordingly, the amount of an extracted component penetrating into the surface layer increased, and hence the hardness of the surface layer after severe standing reduced as compared with that before the severe standing. Accordingly, when an image was output, streak-like density unevenness was observed.

In each of Comparative Examples 4 and 5, a compound having 8 carbon atoms was used as a diol, and hence the size of the network of a network structure formed by an intermolecular force between carbonyl groups in a urethane bond and an ester bond was assumed to enlarge. Accordingly, the amount of an extracted component penetrating into the surface layer increased, and hence the hardness of the surface layer after severe standing reduced as compared with that before the severe standing. Accordingly, when an image was output, streak-like density unevenness was observed.

In each of Comparative Examples 9 and 10, a compound having carbon atoms was used as a diol. In this case, a distance between carbonyl groups in a urethane bond and an ester bond shortens. Accordingly, a carbonyl group attracts a carbonyl group different from a carbonyl group which originally wishes to attract the former carbonyl group by an intermolecular force, and hence the distribution of a crosslink density becomes nonuniform. Accordingly, a portion where the size of the network of a network structure formed by the intermolecular force between the carbonyl groups enlarged was assumed to be established. The amount of an extracted component penetrating into the surface layer increased, and hence the hardness of the surface layer after severe standing reduced as compared with that before the severe standing. Accordingly, when an image was output, streak-like density unevenness was observed.

In Comparative Example 11, a compound having 8 carbon atoms was used as a triol, and hence the size of the network of a network structure formed by an intermolecular force between carbonyl groups in a urethane bond and an ester bond was assumed to enlarge. Accordingly, the amount of an extracted component penetrating into the surface layer increased, and hence the hardness of the surface layer after severe standing reduced as compared with that before the severe standing. Accordingly, when an image was output, streak-like density unevenness was observed.

In each of Comparative Examples 12 and 13, a polyether polyol was used instead of a polyester polyol. Accordingly, an intermolecular force based on the polarization of a carbonyl group was absent and hence the size of the network of a network structure was assumed to enlarge. Accordingly, the amount of an extracted component penetrating into the surface layer increased, and hence the hardness of the surface layer after severe standing reduced as compared with that before the severe standing. Accordingly, when an image was output, streak-like density unevenness was observed.

In each of Comparative Examples 14 and 15, the surface layer was produced without the use of any hydroxyl group-terminated prepolymer. Accordingly, the distribution of a crosslink density became nonuniform, and hence a portion where the size of the network of a network structure formed by an intermolecular force between carbonyl groups in a urethane bond and an ester bond enlarged was assumed to be established. Accordingly, the amount of an extracted component penetrating into the surface layer increased, and hence the hardness of the surface layer after severe standing reduced as compared with that before the severe standing. Accordingly, when an image was output, streak-like density unevenness was observed.

In each of Comparative Examples 16 and 17, the surface layer was produced without the use of any isocyanate-terminated prepolymer. Accordingly, the distribution of a crosslink density became nonuniform, and hence a portion where the size of the network of a network structure formed by an intermolecular force between carbonyl groups in a urethane bond and an ester bond enlarged was assumed to be established. Accordingly, the amount of an extracted component penetrating into the surface layer increased, and hence the hardness of the surface layer after severe standing reduced as compared with that before the severe standing. Accordingly, when an image was output, streak-like density unevenness was observed.

It was revealed from the foregoing that the use of the electrophotographic member of the present invention was able to suppress the reductions in physical properties of the surface layer due to the extracted component from the elastic layer even when the member remained unoperated for a long time period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-170055, filed Jul. 31, 2012, which is hereby incorporated by reference herein in its entirety.

REFERENCE SIGNS LIST

1 developing roller
1*a* support
1*b* elastic layer
1*c* surface layer

What is claimed is:

1. An electrophotographic member, comprising:

a support;

an elastic layer formed on the support; and a surface layer covering a surface of the elastic layer and containing a urethane resin, and, wherein the urethane resin comprises a reaction product of a hydroxyl group-terminated prepolymer obtained by reacting the following polyester polyol (1) or the following polyester polyol (2) with a polyisocyanate, and an isocyanate-terminated prepolymer obtained by reacting the following polyester polyol (3) or the following polyester polyol (4) with a polyisocyanate; wherein polyester polyol (1) is:

a reaction product of at least one carboxylic acid selected from the group consisting of adipic acid and suberic acid, an aliphatic triol having 3 or more and 6 or less carbon atoms, and an aliphatic diol having 4 or more and 6 or less carbon atoms;

polyester polyol (2) is:

a reaction product of

ϵ-caprolactone and an aliphatic triol having 3 or more and 6 or less carbon atoms;

polyester polyol (3) is:

a reaction product of at least one carboxylic acid selected from the group consisting of adipic acid and suberic acid, an aliphatic triol having 3 or more and 6 or less carbon atoms, and an aliphatic diol having 4 or more and 6 or less carbon atoms;

polyester polyol (4) is:

a reaction product of

ϵ-caprolactone and an aliphatic triol having 3 or more and 6 or less carbon atoms.

2. The electrophotographic member according to claim 1, wherein the polyisocyanate comprises 4,4'-diphenylmethane diisocyanate or polymethylene polyphenyl polyisocyanate.

3. The electrophotographic member according to claim 1, wherein the polyisocyanate comprises 4,4'-diphenylmethane diisocyanate.

4. The electrophotographic member according to claim 1, wherein the hydroxyl group-terminated prepolymer has an average functional group valence number of 4.0 or more and 5.0 or less, and the isocyanate-terminated prepolymer has an average functional group valence number of 3.0 or more and 4.0 or less.

5. The electrophotographic member according to claim 1, wherein the polyester polyols (1) to (4) each have an average functional group valence number of 2.5 or more and 3.4 or less.

6. The electrophotographic member according to claim 1, wherein the surface layer further contains an acrylic resin having a structure represented by the following structural formula (1), and at least one structure selected from the group consisting of a structure represented by the following structural formula (2) and a structure represented by the following structural formula (3):

Structural formula (1)

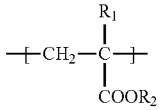

in the structural formula (1), $R_1$ represents a hydrogen atom or a methyl group, and $R_2$ represents a linear or branched alkyl group having 1 to 7 carbon atoms and may contain an oxygen atom between carbon atoms;

Structural formula (2)

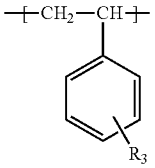

in the structural formula (2), $R_3$ represents a hydrogen atom, or a linear or branched alkyl group having 1 to 4 carbon atoms;

Structural formula (3)

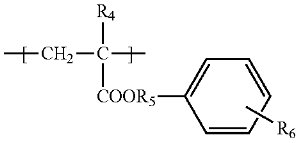

in the structural formula (3), $R_4$ represents a hydrogen atom or a methyl group, $R_5$ represents an alkylene group having 1 to 4 carbon atoms, and $R_6$ represents a hydrogen atom, or a linear or branched alkyl group having 1 to 4 carbon atoms.

7. The electrophotographic member according to claim 1, wherein the elastic layer contains a silicone rubber.

8. A developing device, comprising:

a developing member; and a developer layer thickness regulating member abutting on a surface of the developing member, wherein the developing member comprises the electrophotographic member according to claim 1.

9. An electrophotographic apparatus, comprising the developing device according to claim 8.

10. An electrophotographic apparatus, comprising:

an electrophotographic photosensitive member; and a charging member placed to abut on the electrophotographic photosensitive member, wherein the charging member comprises the electrophotographic member according to claim 1.

* * * * *